US00RE37490B1

(19) United States
(12) Reissued Patent
Andermo et al.

(10) Patent Number: US RE37,490 E
(45) Date of Reissued Patent: Jan. 1, 2002

(54) ELECTRONIC CALIPER USING A REDUCED OFFSET INDUCED CURRENT POSITION TRANSDUCER

(75) Inventors: Nils I. Andermo, Kirkland; Karl G. Masreliez, Bellevue, both of WA (US)

(73) Assignee: Mitutoyo Corporation, Kawasaki (JP)

(21) Appl. No.: 09/527,518

(22) Filed: Mar. 16, 2000

Related U.S. Patent Documents

Reissue of:
(64) Patent No.: 5,901,458
Issued: May 11, 1999
Appl. No.: 08/975,651
Filed: Nov. 21, 1997

(51) Int. Cl.[7] ..... G01B 7/02
(52) U.S. Cl. ..... 33/810; 33/784; 33/708; 324/207.24
(58) Field of Search ..... 33/706, 708, 783, 33/784, 810, 811, 812; 324/207.15, 207.17, 207.24, 244, 249, 259, 664

(56) References Cited

U.S. PATENT DOCUMENTS

| | | | |
|---|---|---|---|
| 3,812,481 | A | 5/1974 | Stedtnitz |
| 4,483,077 | A | 11/1984 | Matsumoto et al. |
| 5,225,830 | A | 7/1993 | Andermo et al. |
| 5,253,431 | A | 10/1993 | Smith |
| 5,363,034 | A | 11/1994 | Tada et al. |
| 5,442,865 | A | 8/1995 | Wallrafen |
| 5,625,239 | A | 4/1997 | Persson et al. |
| 5,798,640 | A | 8/1998 | Gier et al. |
| 5,804,963 | A | 9/1998 | Meyer |
| 5,841,274 | A | 11/1998 | Masreliez et al. |
| 5,841,275 | A | 11/1998 | Spies |

FOREIGN PATENT DOCUMENTS

| | | |
|---|---|---|
| DE | 4009977 | 3/1991 |
| EP | 0443148 | 8/1991 |
| EP | 0501453 | 9/1992 |
| EP | 0709648 | 5/1996 |
| WO | WO 95/31696 | 11/1995 |
| WO | WO 97/19323 | 5/1997 |

*Primary Examiner*—G. Bradley Bennett
(74) *Attorney, Agent, or Firm*—Oliff & Berridge, PLC

(57) ABSTRACT

An electronic caliper having a reduced offset position transducer that uses two sets of coupling loops on a scale to inductively couple a transmitter winding on a read head on a slide to one or more receiver windings on the read head. The transmitter winding generates a primary magnetic field. The transmitter winding is inductively coupled to first loop portions of first and second sets of coupling loops by a magnetic field. Second loop portions of the first and second sets of coupling loops are interleaved and generate secondary magnetic fields. A receiver winding is formed in a periodic pattern of alternating polarity loops and is inductively coupled to the second loop portions of the first and second sets of coupling loops by the secondary magnetic fields. Depending on the relative position between the read head and the scale, each polarity loop of the receiver winding is inductively coupled to a second loop portion of either the first or second set of coupling loops. The relative positions of the first and second loop portions of the first and second sets of coupling loops are periodic and dependent on the relative position of the coupling loops on the scale.

74 Claims, 13 Drawing Sheets

ELECTRONIC CALIPER USING A REDUCED OFFSET INDUCED CURRENT POSITION TRANSDUCER

Matter enclosed in heavy brackets [ ] appears in the original patent but forms no part of this reissue specification; matter printed in italics indicates the additions made by reissue.

BACKGROUND OF THE INVENTION

1. Field of Invention

This invention relates to an electronic caliper. More particularly this invention is directed to electronic calipers using a reduced offset induced current position transducer.

2. Description of Related Art

U.S. patent application Ser. No. 08/645,483 filed May 13, 1996, and incorporated herein in its entirety, discloses an electronic caliper using an inductive position transducer.

The operation of the electronic caliper using the inductive position transducer described in the application Ser. No. '483 is generally shown in FIGS. 1, 2, and 3. As shown in FIG. 1, an inductive caliper 100 includes an elongated beam 102. The elongated beam 102 is a rigid or semi-rigid bar having a generally rectangular cross section. A groove 106 is formed in an upper surface of the elongated beam 102. An elongated measuring scale 104 is rigidly bonded to the elongated beam 102 in the groove 106. The groove 106 is formed in the beam 102 at a depth about equal to the thickness of the scale 104. Thus, the top surface of the scale 104 is very nearly coplanar with the top edges of beam 102.

A pair of laterally projecting, fixed jaws 108 and 110 are integrally formed near a first end 112 of the beam 102. A corresponding pair of laterally projecting movable jaws 116 and 118 are formed on a slider assembly 120. The outside dimensions of an object are measured by placing the object between a pair of engagement surfaces 114 on the jaws 108 and 116. Similarly, the inside dimensions of an object are measured by placing the jaws 110 and 118 within an object. The engagement surfaces 122 of the jaws 110 and 118 are positioned to contact the surfaces on the object to be measured.

The engagement surfaces 122 and 114 are positioned so that when the engagement surfaces 114 of the jaws 108 and 116 are contacting each other, the engagement surfaces 122 of the jaws 110 and 118 are aligned with each other. In this position, the zero position (not shown), both the outside and inside dimensions measured by the caliper 100 should be zero.

The caliper 100 also includes a depth bar 124 which is attached to the slider assembly 120. The depth bar 124 projects longitudinally from the beam 102 and terminates at an engagement end 126. The length of the depth bar 124 is such that the engagement end 126 is flush with a second end 128 of the beam 102 when the caliper 100 is at the zero position. By resting the second end 128 of the beam 102 on a surface in which a hole is formed and extending the depth bar 124 into the hole until the end 126 touches the bottom of the hole, the caliper 100 is able to measure the depth of the hole.

Whether a measurement is made using the outside measuring jaws 108 and 116, the inside measuring jaws 110 and 118, or the depth bar 124, the measured dimension is displayed on a conventional digital display 134, which is mounted in a cover 136 of the caliper 100. A pair of push button switches 130 and 132 are also mounted in the cover 136. The switch 130 turns on and off a signal processing and display electronic circuit 160 of the slider assembly 120. The switch 132 is used to reset the display 134 to zero.

As shown in FIG. 1, the slider assembly 120 includes a base 138 with a guiding edge 140. The guiding edge 140 contacts a side edge 146 of the elongated beam 102 when the slider assembly 120 straddles the elongated beam 102. This ensures accurate operation of the caliper 100. A pair of screws 144 bias a resilient pressure bar 146 against a mating edge of the beam 102 to eliminate free play between the slider assembly 120 and the elongated beam 102.

The depth bar 124 is inserted into a depth bar groove 148 formed on an underside of the elongated beam 102. The depth bar groove 148 extends along the underside of the elongated beam 102 to provide clearance for the depth bar 124. The depth bar 124 is held in the depth bar groove 148 by an end stop 150. The end stop 150 is attached to the underside of the beam 102 at the second end 128. The end stop 150 also prevents the slider assembly 120 from inadvertently disengaging from the elongated beam 102 at the second end 128 during operation.

The slider assembly 120 also includes a read head assembly 152 mounted on the base 138 above the elongated beam 102. Thus, the base 138 and read head assembly 152 move as a unit. The read head assembly 152 includes a substrate 154 such as a conventional printed circuit board. The substrate 154 bears an inductive read head 158 on its lower surface. A signal processing and display electronic circuit 160 is mounted on an upper surface of the substrate 154. A resilient seal 156 is compressed between the cover 136 and the substrate 154 to prevent contamination of the signal processing and display electronic circuit 160.

As shown in FIG. 2, the read head 158 is covered by a thin, durable, insulative coating 162, which is preferably approximately 50 microns thick.

The scale 104 is preferably an elongated printed circuit board (PCB) 164. As shown in FIG. 1, a set of magnetic flux modulators 166 are spaced apart along the PCB 164 in a periodic pattern. The flux modulators 166 are preferably formed of copper. The flux modulators 166 are preferably formed according to conventional printed circuit board manufacturing techniques, although many other methods of fabrication may be used. As shown in FIG. 2, a protective insulating layer 168 (preferably being at most 100 microns thick) covers the flux modulators 166. The protective layer 168 can include printed markings, as shown in FIG. 1.

The slider assembly 120 carries the read head 158 so that it is slightly separated from the beam 102 by an air gap 170 formed between the insulative coatings 162 and 168. The air gap 170 is preferably on the order of 0.5 mm. Together, the read head 158 and the flux modulators 166 form an inductive transducer.

As shown in FIG. 3, the magnetic flux modulators 166 are distributed along a measuring axis 174 of the elongated beam 102 at a pitch equal to a wavelength $\lambda$, which is described in more detail below. The flux modulators 166 have a nominal width along the measuring axis 174 of $\lambda/2$. The flux modulators 166 have a width d in a direction perpendicular to the measuring axis 174.

The read head 158 includes a generally square transmitter winding 176 that is connected to a drive signal generator 178. The drive signal generator 178 provides a time varying drive signal to the transmitter winding 176. The time varying drive signal preferably results in a sinusoidal signal in the transmitter winding 176, and more preferably an exponentially decaying sinusoidal signal. When the time varying drive signal is applied to the transmitter winding 176, the time varying current flowing in the transmitter winding 176 generates a time varying, or changing, magnetic field. Because the transmitter winding 176 is generally rectangularly shaped, the generated magnetic field is generally constant within a flux region inside the transmitter winding 176.

The read head 158 further includes a first receiver winding 180 and a second receiver winding 182 positioned on the read head 158 within the flux region inside the transmitter winding 176. Each of the first receiver winding 180 and the second receiver winding 182 is formed by a plurality of first loop segments 184 and second loop segments 186. The first loop segments 184 are formed on a first surface of a layer of the printed circuit board 154. The second loop segments 186 are formed on another surface of the layer of the printed circuit board 154. The layer of the printed circuit board 154 acts as an electrical insulation layer between the first loop segments 184 and the second loop segments 186. Each end of the first loop segments 184 is connected to one end of one of the second loop segments 186 through feed-throughs 188 formed in the layer of the printed circuit board 154.

The first and second loop segments 184 and 186 are preferably sinusoidally shaped. Accordingly, as shown in FIG. 3 the first and second loop segments 184 and 186 forming each of the receiver windings 180 and 182 form a sinusoidally shaped periodic pattern having a wavelength $\lambda$. Each of the receiver windings 180 and 182 are thus formed having a plurality of loops 190 and 192.

The loops 190 and 192 in each of the first and second receiver windings 180 and 182 have a width along the measuring axis 174 equal to $\lambda/2$. Thus, each pair of adjacent loops 190 and 192 has a width equal to $\lambda$. Furthermore, the first and second loop segments 184 and 186 go through a full sinusoidal cycle in each pair of adjacent loops 190 and 192. Thus, $\lambda$ corresponds to the sinusoidal wavelength of the first and second receiver windings 180 and 182. Furthermore, the second receiver winding 182 is offset by $\lambda/4$ from the first receiver winding 180 along the measuring axis 174. That is, the first and second receiver windings 180 and 182 are in quadrature.

The changing drive signal from the drive signal generator 178 is applied to the transmitter winding 176 such that current flows in a transmitter winding 176 from a first terminal 176*a*, through the transmitter winding 176 and out through a second terminal 176*b*. Thus, the magnetic field generated by the transmitter winding 176 descends into the plane of FIG. 3 within the transmitter winding 176 and rises up out of the plane of FIG. 3 outside the transmitter winding 176. Accordingly, the changing magnetic field within the transmitter winding 176 generates an induced electromagnetic force (EMF) in each of the loops 190 and 192 formed in the receiver windings 180 and 182.

The loops 190 and 192 have opposite winding directions. Thus, the EMF induced in the loops 190 has a polarity that is opposite to the polarity of the EMF induced in the loops 192. The loops 190 and 192 enclose the same area and thus nominally the same amount of magnetic flux. Therefore, the absolute magnitude of the EMF generated in each of the loops 190 and 192 is nominally the same.

There are preferably equal numbers of loops 190 and 192 in each of the first and second receiver windings 180 and 182. Thus, the positive polarity EMF induced in the loops 190 is exactly offset by the negative polarity EMF induced in the loops 192. Accordingly, the net nominal EMF on each of the first and second receiver windings 180 and 182 is zero. Thus, no signal should be output from the first and second receiver windings 180 and 182 as a result solely of the direct coupling from the transmitter winding 176 to the receiver windings 180 and 182.

When the read head 158 is placed in proximity to the PCB 164, the changing magnetic flux generated by the transmitter winding 176 also passes through the flux modulators 166. The flux modulators 166 modulate the changing magnetic flux and can be either flux enhancers or flux disrupters.

When the flux modulators 166 are provided as flux disrupters, the flux modulators 166 are formed as conductive plates or thin conductive films on the PCB 164. As the changing magnetic flux passes through the conductive plates or thin films, eddy currents are generated in the conductive plates or thin films. These eddy currents in turn generate magnetic fields having a field direction that is opposite to that of the magnetic field generated by the transmitter winding 176. Thus, in areas proximate to each of the flux disrupter-type flux modulators 166, the net magnetic flux is less than the net magnetic flux in areas distant from the flux disrupter type flux modulators 166.

When the scale PCB 164 is positioned relative to the read head 158 such that the flux disrupters 166 are aligned with the positive polarity loops 190 of the receiver winding 180, the net EMF generated in the positive polarity loops 190 is reduced compared to the net EMF generated in the negative polarity loops 192. Thus, the receiver winding 190 becomes unbalanced and has a net negative signal across its output terminals 180*a* and 180*b*.

Similarly, when the flux disrupters 166 are aligned with the negative polarity loops 192, the net magnetic flux through the negative polarity loops 192 is disrupted or reduced. Thus, the net EMF generated in the negative polarity loops 192 is reduced relative to the net EMF generated in the positive polarity loops 190. Thus, the first receiver winding 180 has a net positive signal across its output terminals 180*a* and 180*b*.

When the flux modulators 166 are provided as flux enhancers, this result is exactly reversed. The flux enhancer type flux modulators 166 are formed by portions of high magnetic permeability material provided in or on the scale member 104, in place of the conductive plates of PCB 164. The magnetic flux generated by the transmitter winding 176 preferentially passes through the high magnetic permeability flux enhancer type flux modulators 166. That is, the density of the magnetic flux within the flux enhancers 166 is enhanced, while the flux density in areas outside the flux enhancers 166 is reduced.

Thus, when the flux enhancers 166 are aligned with the positive polarity loops 190 of the second receiver winding 182, the flux density through the positive polarity loops 190 is greater than a flux density passing through the negative polarity loops 192. Thus, the net EMF generated in the positive polarity 190 increases, while the net EMF induced in the negative polarity loops 192 decreases. This appears as a positive signal across the terminals 182*a* and 182*b* of the second receiver winding 182.

When the flux enhancers 166 are aligned with the negative polarity loops 192, the negative polarity loops 192 generate an enhanced EMF relative to the EMF induced in the positive polarity loops 190. Thus, a negative signal appears across the terminals 182*a* and 182*b* of the second receiver winding 180. It should also be appreciated that, as outlined in the incorporated reference, both the flux enhancing and flux disrupting effects can be combined in a single scale, where the flux enhancers and flux disrupters are interleaved along the length of the scale 104. This would act to enhance the modulation of the induced EMF, because the effects of both types of flux modulators additively combine.

As indicated above, the width and height of the flux modulators 166 are nominally $\lambda/2$ and d, respectively, while the pitch of the flux modulators 166 is nominally $\lambda$. Similarly, the wavelength of the periodic pattern formed in the first and second receiver windings 180 and 182 is nominally $\lambda$ and the height of the loops 190 and 192 is nominally d. Furthermore, each of the loops 190 and 192 enclose a nominally constant area.

FIG. 4A shows the position-dependent output from the positive polarity loops 190 as the flux modulators 166 move relative to the positive polarity loops 190. Assuming the flux modulators 166 are flux disrupters, the minimum signal amplitude corresponds to those positions where the flux disrupters 166 exactly align with the positive polarity loops 190, while the maximum amplitude positions correspond to the flux disrupters 166 being aligned with the negative polarity loops 192.

FIG. 4B shows the signal output from each of the negative polarity loops 192. As with the signal shown in FIG. 4A, the minimum signal amplitude corresponds to those positions where the flux disrupters 166 exactly align with the positive polarity loops 190, while the maximum signal output corresponds to those positions where the flux disrupters exactly align with the negative polarity loops 192. It should be appreciated that if flux enhancers were used in place of flux disrupters, the minimum signal amplitudes in FIGS. 4A and 4B would correspond to the flux enhancers 166 aligning with the negative polarity loops 192, while the maximum signal amplitude would correspond to the flux enhancers 166 aligning with the positive polarity loops 190.

FIG. 4C shows the net signal output from either of the first and second receiver windings 180 and 182. This net signal is equal to the sum of the signals output from the positive and negative polarity loops 190 and 192, i.e., the sum of the signal shown in FIGS. 4A and 4B. The net signal shown in FIG. 4C should ideally be symmetrical around zero, that is, the positive and negative polarity loops 190 and 192 should be exactly balanced to produce a symmetrical output with zero offset.

However, a "DC" (position independent) component often appears in the net signal in a real device. This DC component is the offset signal $V_o$. This offset $V_o$ is an extraneous signal component that complicates signal processing and leads to undesirable position measurement errors. This offset has two sources.

First, the full amplitude of the transmitter field passes through the first and second receiver windings 180 and 182. As outlined above, this induces a voltage in each loop 190 and 192. The induced voltage nominally cancels because the loops 190 and 192 have opposite winding directions. However, to perfectly cancel the induced voltage in the receiver windings requires the positive and negative loops 190 and 192 to be precisely positioned and shaped, for a perfectly balanced result. The tolerances on the balance are critical because the voltages induced directly into the receiver winding loops 180 and 182 by the transmitter winding 176 are much stronger than the modulation in the induced voltage caused by the flux modulators 166.

Second, the spatially modulated field created by the flux modulators also exhibits an average position-independent offset component. That is, the flux modulators 166 within the magnetic field generated by the transmitter winding 176 all create the same polarity spatial modulation in the magnetic field. For example, when flux disrupters are used, the induced eddy current field from the flux modulators has an offset because the flux disrupters within the transmitter field all create a same polarity secondary magnetic field. At the same time, the space between the flux disrupters does not create a secondary magnetic field.

Thus, each positive polarity loop 190 and each negative polarity loop 192 of the receiver windings 180 and 182 sees a net magnetic field that varies between a minimum value and a maximum value having the same polarity. The mean value of this function is not balanced around zero, i.e., it has a large nominal offset. Similarly, when flux enhancers are used, the field modulation due to the flux enhancers has an offset because the enhancers within the transmitter winding 176 all create the same field modulation, while the space between the modulators provides no modulation. Each positive and negative polarity loop 190 and 192 of each receiver winding 180 or 182 therefore sees a modulated field that varies between a minimum value and a maximum value having the same polarity. The mean value of this function also has a large nominal offset.

A receiver winding having an equal number of similar positive and negative polarity loops 190 and 192 helps eliminate the offset components. However, any imperfection in the balance between the positive and negative polarity loops 190 and 192 allows residual offsets according to the previous description.

Both these offset components are expected to be canceled solely by the symmetry between the positive and negative polarity loops 190 and 192 in the first and second windings 180 and 182. This puts very stringent requirements on the manufacturing precision of the receiver windings 180 and 182. Experience in manufacturing a transducer indicates it is practically impossible to eliminate this source of error from the induced current position transducer of a conventional caliper.

Furthermore, any deviations in the width or pitch of the flux modulators 166 will unbalance the receiver windings 180 or 182 in a way that is independent of the relative position between the PCB 164 and the read head 158.

Any signal component which is independent of the transducer position, such as the aforementioned offset components, is regarded as an extraneous signal to the operation of the transducer. Such extraneous signals complicate the required signal processing circuitry and otherwise lead to errors which compromise the accuracy of the transducer.

One proposed solution attempts to reduce the extraneous coupling between the transmitter and receiver windings simply by placing the receiver winding distant from the field produced by the transmitter winding. However, the effectiveness of this technique alone depends on the degree of separation between the transmitter and receiver windings. Hence, this technique contradicts the need for high accuracy linear caliper of compact size. Alternatively, the transmitter field can be confined with magnetically permeable materials so that the effectiveness of a given degree of separation is increased. However, this technique leads to additional complexity, cost, and sensitivity to external fields, in a practical device.

Furthermore, the simple winding configurations disclosed in association with these techniques include no means for creating a device with a measuring range significantly exceeding the span of the transmitter and receive windings. In addition, the simple winding configurations provide no means for significantly enhancing the degree of output signal change per unit of displacement for a given measuring range. Thus, the practical measuring resolution of these devices is limited for a given measuring range.

The need for a high accuracy inductive linear caliper which rejects both extraneous signal components and external fields, is compact, of simple construction, and capable of high resolution measurement over an extended measuring range without requiring increased fabrication and circuit accuracies, has therefore not been met previously.

SUMMARY OF THE INVENTION

This invention provides an electronic caliper using an induced current position transducer with improved winding configurations. The improved winding configurations increase the proportion of the useful output signal component relative to extraneous ("offset") components of the output signal without requiring increased transducer fabrication accuracy. Furthermore, the winding configurations provide means to enhance the degree of output signal change per unit of displacement for a given measuring range.

This is accomplished by winding configurations that minimize and nullify the direct coupling between the transmitter and receiver windings while providing enhanced position-dependent coupling between them through a plurality of coupling windings on the scale which interact with a plurality of spatial modulations of the windings.

In particular, this invention includes an electronic caliper using a reduced offset induced current position transducer having a scale and a read head that are movable relative to each other along a measuring axis. The read head includes a pair of receiver windings extending along the measuring axis and positioned in a center portion of the read head. The read head further includes a transmitter winding extending along the measuring axis and positioned laterally from the receiver windings in a direction perpendicular to the measuring axis.

In a first embodiment of the electronic caliper using the induced current position transducer of this invention, the transmitter winding is divided into a first transmitter loop and a second transmitter loop, with the first transmitter loop placed on one side of the receiver windings and the second transmitter loop placed on the other side of the receiver windings. The magnetic fields created by the first and second loops of the transmitter winding counteract each other in the area of the receiver winding. This minimizes the extraneous effects of any direct coupling from the transmitter winding to the receiver winding.

The scale member has a plurality of first coupling loops extending along the measuring axis and interleaved with a plurality of second measuring loops also extending along the measuring axis. The first coupling loops have a first portion aligned with the first transmitter winding and a second portion aligned with the receiver windings. Similarly, the second coupling loops have a first portion aligned with the second transmitter winding and a second portion aligned with the receiver windings.

In a second embodiment of the induced current position transducer of this invention, the transmitter has only one loop, which is placed alongside the receiver windings on the read head. The scale member in this case has a plurality of first coupling loops arrayed along the measuring axis and interleaved with a second plurality of coupling loops also arrayed along the measuring axis. Both the first and second coupling loops have a first portion aligned with the transmitter winding and a second portion aligned with the receiver windings.

The first and second portions of each first coupling loop are connected in series and are "untwisted". Thus, the magnetic fields induced in the first and second portions of the first coupling loops have the same polarity. In contrast, the first and second portion of each second coupling loop are connected in series and are "twisted". In this case, the magnetic fields induced in the first and second portions of the second coupling loops have opposite polarities. This creates an alternating induced magnetic field along the measuring axis in the area under the receiver winding in response to exciting the transmitter winding.

These winding configurations substantially eliminate several extraneous signal components, resulting in simplified signal processing and improved transducer accuracy and robustness in an economical design.

This invention provides an improved electronic caliper that uses an induced current position transducer with improved winding configurations. This invention uses a transducer with example embodiments that are described in copending U.S. patent application Ser. No. 08/834,432, filed on Apr. 16, 1997, entitled "REDUCED OFFSET HIGH ACCURACY INDUCED CURRENT POSITION TRANSDUCER" which is hereby incorporated by reference in its entirety.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 5:
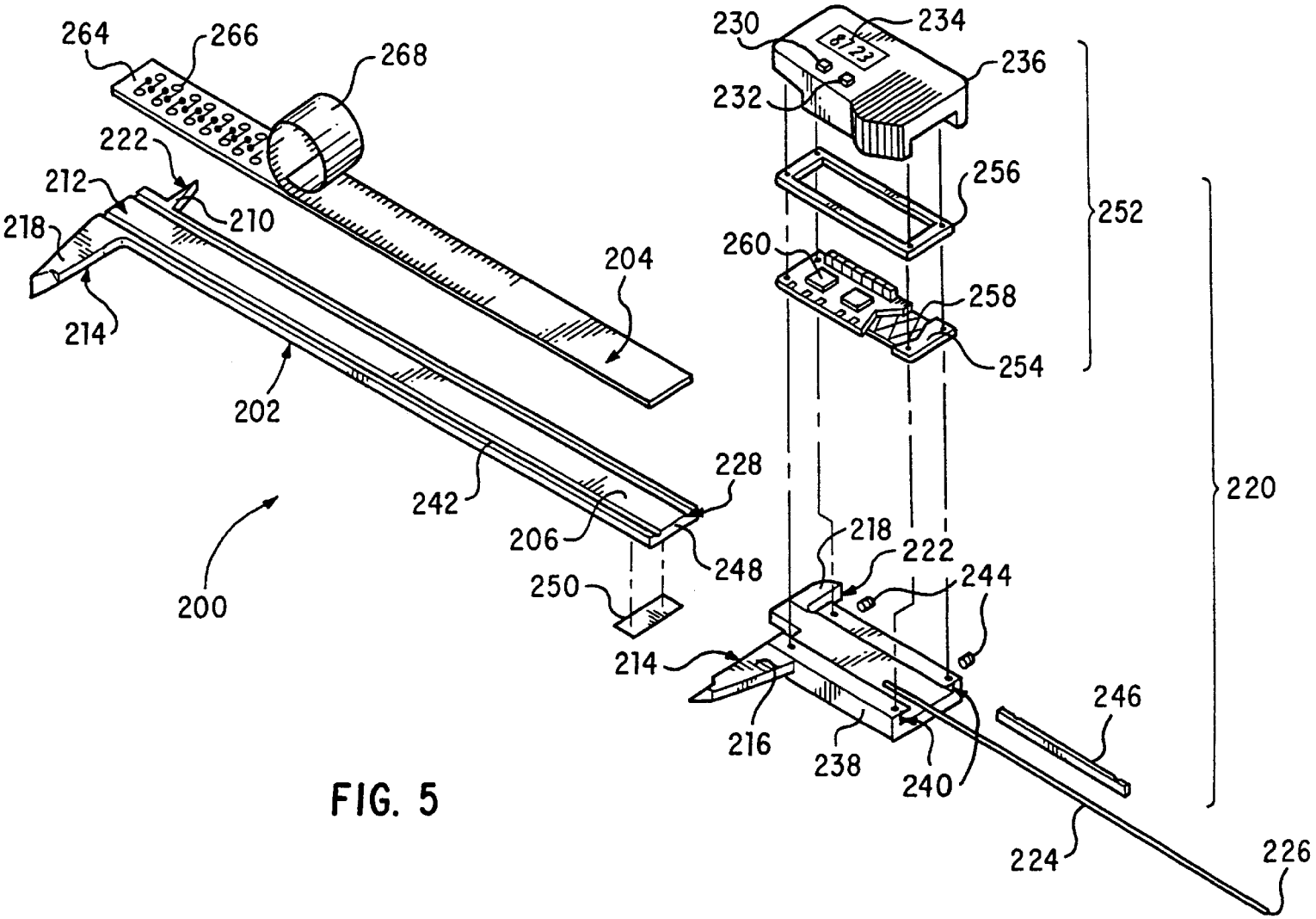
FIG. 5 shows an electronic caliper of this invention using a reduced offset high accuracy induced current position transducer.

As shown in FIG. 5, an inductive caliper 200 includes an elongated beam 202. The elongated beam 202 is a rigid or semi-rigid bar having a generally rectangular cross section. A groove 206 is formed in an upper surface of the elongated beam 202. An elongated measuring scale 204 is rigidly bonded to the elongated beam 202 in the groove 206. The groove 206 is formed in the beam 202 at a depth about equal to the thickness of the scale 204. Thus, the top surface of the scale 204 is very nearly coplanar with the top edges of beam 202.

A pair of laterally projecting, fixed jaws 208 and 210 are integrally formed near a first end 212 of the beam 202. A corresponding pair of laterally projecting movable jaws 216 and 218 are formed on a slider assembly 220. The outside dimensions of an object are measured by placing the object between a pair of engagement surfaces 214 on the jaws 208 and 216. Similarly, the inside dimensions of an object are measured by placing the jaws 210 and 218 within an object. The engagement surfaces 222 of the jaws 210 and 218 are positioned to contact the surfaces on the object to be measured.

The engagement surfaces 222 and 214 are positioned so that when the engagement surfaces 214 of the jaws 208 and 216 are contacting each other, the engagement surfaces 222 of the jaws 210 and 218 are aligned with each other. In this position, the zero position, both the outside and inside dimensions measured by the caliper 200 should be zero.

The caliper 200 also includes a depth bar 224 which is attached to the slider assembly 220. The depth bar 224 projects longitudinally from the beam 202 and terminates at an engagement end 226. The length of the depth bar 224 is such that the engagement end 226 is flush with a second end 228 of the beam 202 when the caliper 200 is at the zero position. By resting the second end 228 of the beam 202 on a surface in which a hole is formed and extending the depth bar 224 into the hole until the end 226 touches the bottom of the hole, the caliper 200 is able to measure the depth of the hole.

Whether a measurement is made using the outside measuring jaws 208 and 216, the inside measuring jaws 210 and 218, or the depth bar 224, the measured dimension is displayed on a conventional digital display 234, which is mounted in a cover 236 of the caliper 200. A pair of push button switches 230 and 232 are also mounted in the cover 236. The switch 230 turns on and off a signal processing and display electronic circuit 260 of the slider assembly 220. The switch 232 is used to reset the display 234 to zero.

As shown in FIG. 5, the slider assembly 220 includes a base 238 with a guiding edge 240. The guiding edge 240 contacts a side edge 242 of the elongated beam 202 when the slider assembly 220 straddles the elongated beam 202. This ensures accurate operation of the caliper 200. A pair of screws 244 bias a resilient pressure bar 246 against a mating edge of the beam 202 to eliminate free play between the slider assembly 220 and the elongated beam 202. The depth bar 224 is inserted into a depth bar groove 248 formed on an underside of the elongated beam 202. The depth bar groove 248 extends along the underside of the elongated beam 202 to provide clearance for the depth bar 224. The depth bar 224 is held in the depth bar groove 248 by an end stop 250. The end stop 250 is attached to the underside of the beam 202 at the second end 228. The end stop 250 also prevents the slider assembly 220 from inadvertently disengaging from the elongated beam 202 at the second end 228 during operation.

The slider assembly 220 also includes a read head assembly 252 mounted on the base 238 above the elongated beam 202. Thus, the base 238 and read head assembly 252 move as a unit. The read head assembly 252 includes a substrate 254, such as a conventional printed circuit board. The substrate 254 bears an inductive read head 258 on its lower surface. A signal processing and display electronic circuit 260 is mounted on an upper surface of the substrate 254. A resilient seal 256 is compressed between the cover 236 and the substrate 254 to prevent contamination of the signal processing and display electronic circuit 260.

The slider assembly 220 carries the read head 258 so that it is slightly separated from the beam 202 by an air gap 270 formed between the insulative coatings 262 and 268. The air gap 270 is preferably on the order of 0.5 mm. Together, the read head 258 and the flux couplers 266 form an inductive transducer.

Figure 6:
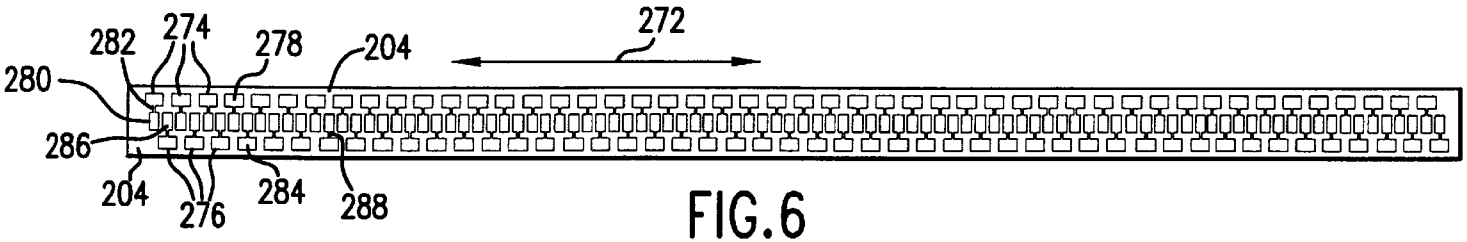
FIG. 6 shows a first embodiment of the scale for the reduced offset induced current position transducer of the electronic caliper of this invention.
Figure 7:
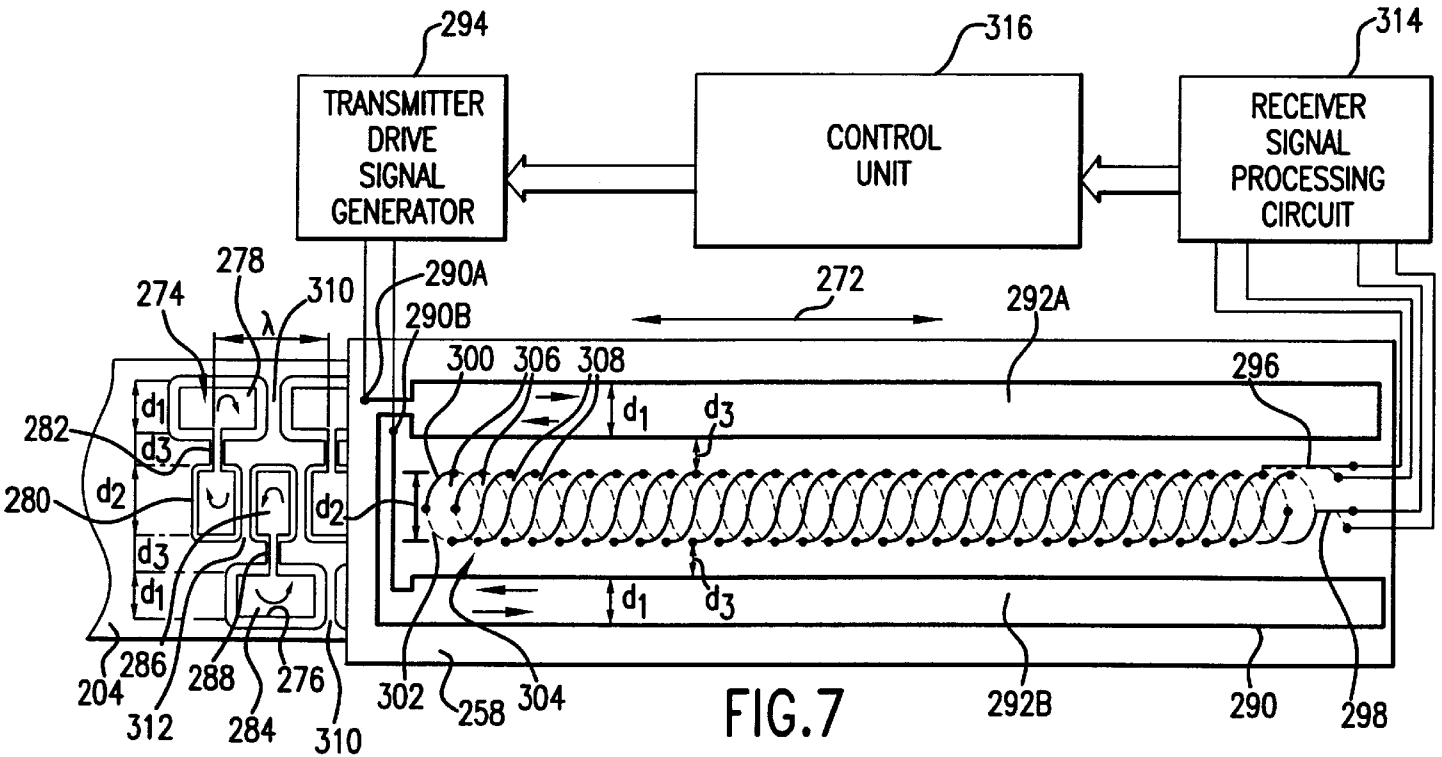
FIG. 7 shows a first embodiment of the read head for the reduced offset induced current position transducer of the electronic caliper of this invention.

FIGS. 6 and 7 show a first embodiment of the reduced-offset incremental induced current position transducer 200 used in the electronic caliper of this invention, which produces an output type usually referred to as "incremental". "Incremental" output is defined as a cyclic output which is repeated according to a design-related increment of transducer displacement.

In particular, FIG. 6 shows a first embodiment of the reduced offset scale 204 of the transducer 200. The reduced-offset scale 204 includes a first plurality of coupling loops 274 interleaved with a second plurality of coupling loops 276. Each of the coupling loops 274 and 276 is electrically isolated from the others of the first and second plurality of coupling loops 274 and 276.

Each of the first plurality of coupling loops 274 includes a first loop portion 278 and a second loop portion 280 connected by a pair of connecting conductors 282. Similarly, each of the second plurality of coupling loops 276 includes a first loop portion 284 and a second loop portion 286 connected by a pair of connecting conductors 288.

In the first plurality of coupling loops 274, the first loop portions 278 are arranged along one lateral edge of the scale 204 and are arrayed along a measuring axis 272. The second loop portions 280 are arranged along the center of the scale 204 and are arrayed along the measuring axis 272. The connecting conductors 282 extend perpendicularly to the measuring axis 272 to connect the first loop portions 278 to the second loop portions 280.

Similarly, in the second plurality of coupling loops 276, the first loop portions 284 are arranged along a second lateral edge of the scale 204 and arrayed along the measuring axis 272. The second loop portions 286 are arranged along the center of the scale 204 along the measuring axis 272, interleaved with the second loop portions 280 of the second coupling loops 276. The connecting conductors 288 extend generally perpendicularly to the measuring axis 272 to connect the first loop portions 284 to the second loop portions 286.

As shown in FIG. 7, the read head 258 of the transducer 200 includes a transmitter winding 290 having a first transmitter winding portion 292A and a second transmitter winding portion 292B. The first transmitter winding portion 292A is provided at a first lateral edge of the read head 258 while the second transmitter winding portion 292B is provided at the other lateral edge of the read head 258. Each of the first and second transmitter winding portions 292A and 292B have the same long dimension extending along the measuring axis 272. Furthermore, each of the first and second transmitter winding portions 292A and 292B have a short dimension that extends a distance $d_1$ in a direction perpendicular to the measuring axis 272.

The terminals 290A and 290B of the transmitter winding 290 are connected to the transmitter drive signal generator 294. The transmitter drive signal generator 294 outputs a time-varying drive signal to the transmitter winding terminal 292A. Thus a time-varying current flows through the transmitter winding 292 from the transmitter winding terminal 292A to the transmitter winding terminal 292B.

In response, the first transmitter winding portion 292A generates a magnetic field that rises up out of the plane of FIG. 7 inside the first transmitter winding portion 292A and descends into the plane of FIG. 7 outside the loop formed by the first transmitter winding portion 292A. In contrast, the second transmitter winding portion 292B generates a primary magnetic field that rises up out of the plane of FIG. 7 outside the loop formed by the second transmitter winding portion 292B and descends into the plane of FIG. 7 inside the loop formed by the second transmitter winding portion 292B.

A current is then induced in the coupling loops 274 and 276 that counteracts the change of magnetic field. Thus, the induced current in each of the coupling loop sections 278 and 284 flows in a direction opposite to the current flowing in the respective adjacent portions of the transmitter loops 292A and 292B. As shown in FIG. 7 adjacent ones of the second loop portions 280 and 286 in the center section of the scale have loop currents having opposite polarities. Thus, a secondary magnetic field is created having field portions of opposite polarity periodically distributed along the center section of the scale. The wavelength $\lambda$ of the periodic secondary magnetic field is equal to the distance between successive second loop portions 280 (or 286).

Figure 1:
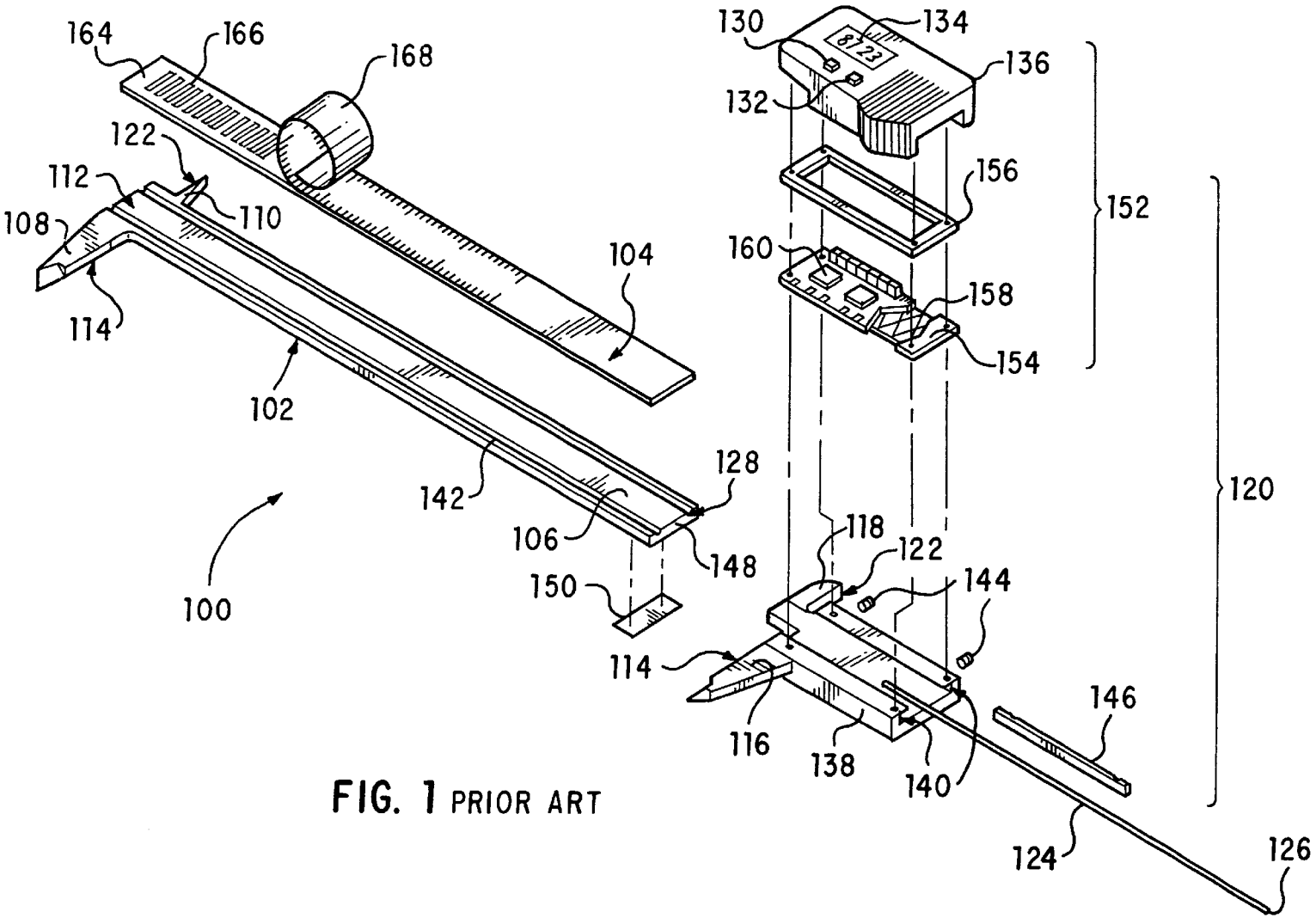
FIG. 1 PRIOR ART
FIG. 1 shows an electronic caliper using an induced current position transducer having undesirable extraneous signal offset components.
Figure 2:
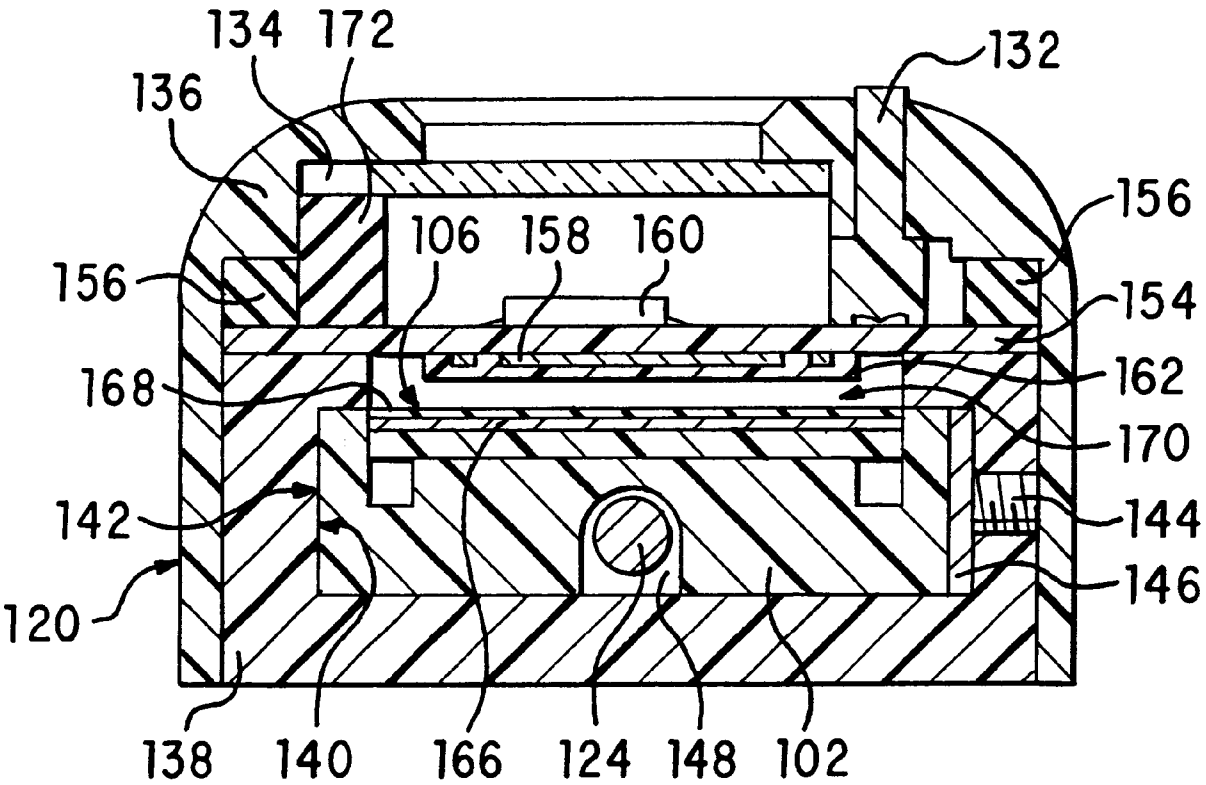
FIG. 2 PRIOR ART
FIG. 2 is a cross-sectional view of the caliper of FIG. 1.
Figure 3:
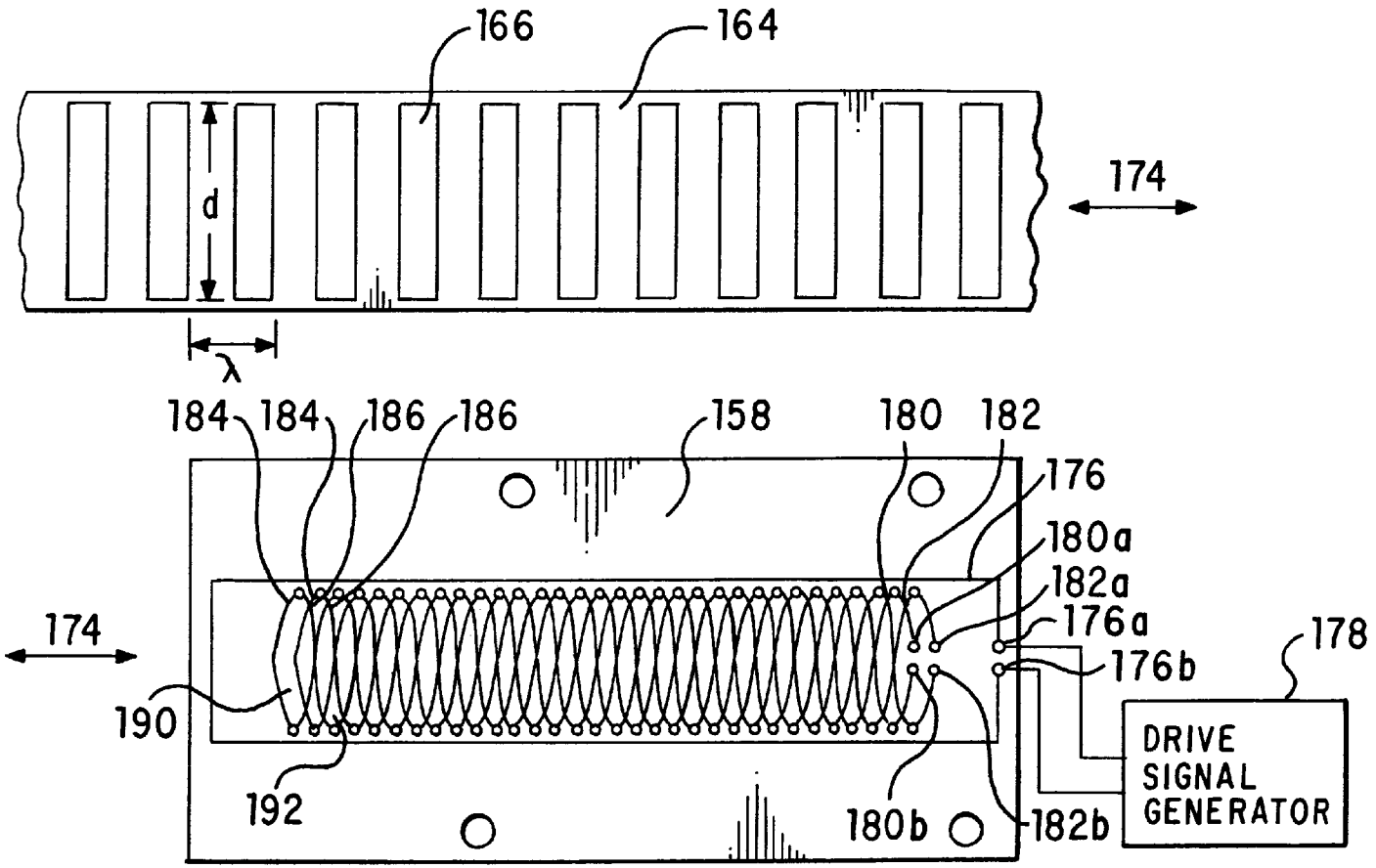
FIG. 3 PRIOR ART
FIG. 3 shows the induced current position transducer of the electronic caliper of FIG. 1.

The read head 258 also includes first and second receiver windings 296 and 298 that are generally identical to the first and second receiver windings 180 and 182 shown in FIG. 3. In particular, similarly to the first and second receiver windings 180 and 182 shown in FIG. 3, the first and second receiver windings 296 and 298 are each formed by a plurality of sinusoidally-shaped loop segments 300 and 302 formed on opposite sides of an insulating layer of the printed circuit board forming the read head 258.

The loop segments 300 and 302 are linked through feed-throughs 304 to form alternating positive polarity loops 306 and negative polarity loops 308 in each of the first and second receiver windings 296 and 298. The receiver windings 296 and 298 are positioned in the center of the read head 258 between the first and second transmitter portions 292A and 292B. Each of the first and second receiver windings 296 and 298 extends a distance $d_2$ in the direction perpendicular to the measuring axis.

Extraneous (position independent and scale independent) coupling from the transmitter loops to the receiver loops is generally avoided in this configuration. That is, the primary magnetic fields generated by the first and second transmitter portions 292A and 292B point in opposite directions in the vicinity of the first and second receiver windings 296 and 298. Thus, the primary magnetic fields counteract each other in the area occupied by the first and second receiver windings 296 and 298. Ideally, the primary magnetic fields completely counteract each in this area. The first and second receiver windings 296 and 298 are spaced equal distances $d_3$ from the inner portions of the first and second transmitter winding portions 292A and 292B. Thus, the magnetic fields generated by each of the first and second transmitter winding portions 292A and 292B in the portion of the read head 258 occupied by the first and second receiver windings 296 and 298 are in symmetric opposition and the associated inductive effects effectively cancel each other out. The net voltage induced in the first and second receiver windings 296 and 298 by extraneous direct coupling to the first and second transmitter winding portions 292A and 292B is reduced to a first extent by positioning the transmitter windings away from the receiver windings. Secondly, the symmetric design effectively reduces the net extraneous coupling to zero.

Each of the first plurality of coupling loops 274 is arranged at a pitch equal to a wavelength $\lambda$ of the first and second receiver windings 296 and 298. Furthermore, the first loop portions 278 each extends a distance along the measuring axis 272 which is as close as possible to the wavelength $\lambda$ while still providing an insulating space 310 between adjacent ones of the first loop portions 276 and 278. In addition, the first loop portions 276 and 278 extend the distance $d_1$ in the direction perpendicular to the measuring axis 272.

Similarly, the second plurality of coupling loops 276 are also arranged at a pitch equal to the wavelength $\lambda$. The first loop portions 284 also extend as close as possible to each other along the measuring axis to the wavelength $\lambda$ while providing the space 310 between adjacent ones of the first loop portions 284. The first loop portions 284 also extend the distance $d_1$ in the direction perpendicular to the measuring axis 272.

The second loop portions 280 and 286 of the first and second pluralities of coupling loops 274 and 276 are also arranged at a pitch equal to the wavelength $\lambda$. However, each of the second loop portions 280 and 286 extends along the measuring axis as close as possible to only one-half the wavelength $\lambda$. An insulating space 312 is provided between each adjacent pair of second loop portions 280 and 286 of the first and second pluralities of coupling loops 274 and 276, as shown in FIG. 7. Thus, the second loop portions 280 and 286 of the first and second pluralities of coupling loops 274 and 276 are interleaved along the length of the scale 204. Finally, each of the second loop portions 280 and 286 extends the distance $d_2$ in the direction perpendicular to the measuring axis 272.

As shown in FIG. 7, the second loop portions 280 and 286 are spaced the distance $d_3$ from the corresponding first loop portions 278 and 284. Accordingly, when the read head 258 is placed in proximity to the scale 204, as shown in FIG. 7, the first transmitter winding portion 292A aligns with the first loop portions 278 of the first plurality of coupling loops 274. Similarly, the second transmitter winding portion 292B aligns with the first loop portions 284 of the second plurality of coupling loops 276. Finally, the first and second receiver windings 296 and 298 align with the second loop portions 280 and 286 of the first and second coupling loops 274 and 276. As will be apparent from the preceding and the following discussions, the area enclosed by the second loop portions 280 and 286 define a sensing track extending parallel to the measuring axis, and that substantially all of the effective magnetic field passing through the sensing track is due solely to the current flow in the second loop portions.

In operation, a time-varying drive signal is output by the transmitter drive signal generator 294 to the transmitter winding terminal 290A. Thus, the first transmitter winding portion 292A generates a first changing magnetic field having a first direction while the second transmitter winding portion 292B generates a second magnetic field in a second direction that is opposite to the first direction. This second magnetic field has a field strength that is equal to a field strength of the first magnetic field generated by the first transmitter winding portion 292A.

Each of the first plurality of coupling loops 274 is inductively coupled to the first transmitter winding portion 292A by the first magnetic field generated by the first transmitter winding portion 292A. Thus, an induced current flows clockwise through each of the first plurality of coupling loops 274. At the same time the second plurality of coupling loops 276 is inductively coupled to the second transmitter winding portion 292B by the second magnetic field generated by the second transmitter winding portion 292B. This induces a counterclockwise current to flow in each of the second plurality of coupling loops 276. That is, the currents through the second portions 280 and 286 of the coupling loops 274 and 276 flow in opposite directions.

The clockwise flowing current in each of the second portions 280 of the first coupling loops 274 generates a third magnetic field that depends into the plane of FIG. 7 within the second portions 280. In contrast, the counterclockwise flowing currents in the second loop portions 286 of the second coupling loops 276 generate a fourth magnetic field that rises out of the plane of FIG. 7 within the second loop portions 286 of the second coupling loops 276. Thus, a net alternating magnetic field is formed along the measuring axis 272. This net alternating magnetic field has a wavelength which is equal to the wavelength $\lambda$ of the first and second receiver windings 296 and 298.

Accordingly, when the positive polarity loops 306 of the first receiver winding 296 are aligned with either the second loop portions 280 or 286, the negative polarity loops 308 of the first receiver winding 296 are aligned with the other of the second loop portions 280 or 286. This is also true when the positive polarity loops 306 and the negative polarity loops 308 of the second receiver winding 298 are aligned with the second loop portions 280 and 286. Because the alternating magnetic field generated by the second loop portions 280 and 286 is spatially modulated at the same wavelength as the spatial modulation of the first and second receiver windings 296 and 298, the EMF generated in each of the positive and negative polarity loops 306 and 308 when aligned with the second loop portions 280 is equal and opposite to the EMF generated when they are aligned with the second loop portions 286.

Figure 4A:
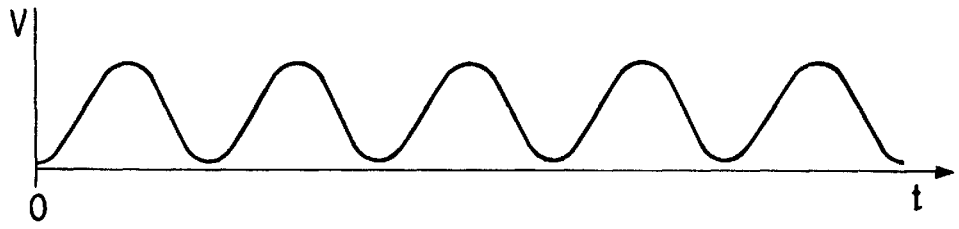
FIG. 4A shows the position-dependent output of the positive polarity loops of FIG. 3.
Figure 4B:
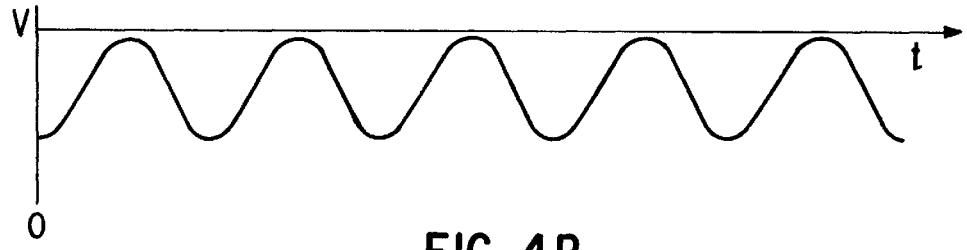
FIG. 4B shows the position-dependent output of the negative polarity loops of FIG. 3.
Figure 4C:
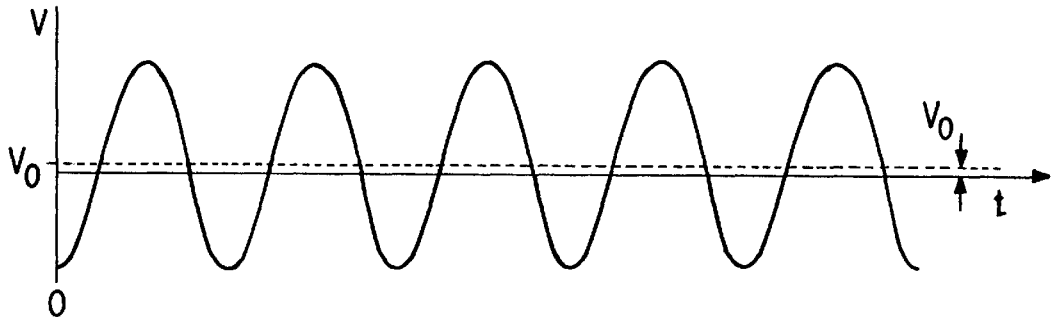
FIG. 4C shows the net position-dependent output of the positive and negative polarity loops of FIG. 3.

Thus, the net output of the positive polarity loops 306, as the read head 258 moves relative to the scale 204 is a sinusoidal function of the relative position of the read head along the scale and the offset component of the output signal due to extraneous coupling is nominally zero. Similarly, the net output from the negative polarity loops 308, as the read head 258 moves relative to the scale 204, is also sinusoidal and centered on the position axis. The EMF output from the positive polarity loops 306 and the negative polarity loops 308 are in phase. They thus generate a net position-dependent output signal corresponding to FIG. 4C, but without the DC offset $V_o$.

Finally, the first and second receiver windings 296 and 298, like the first and second receiver windings 138 and 140, are in quadrature. Thus, the output signal generated by the first receiver winding 296 and output to the receiver signal processing circuit 314 is 90 degrees out of phase with the signal output by the second receiver winding 298 to the receiver signal processing circuit 314.

The receiver signal processing circuit 314 inputs and samples the output signals from the first and second receiver windings 296 and 298, converts the signals to digital values and outputs them to the control unit 316. The control unit 316 processes these digitized output signals to determine the relative position between the read head 258 and the scale 204 within a wavelength $\lambda$.

It should be appreciated that, with a suitable feed-through arrangement, either the positive polarity loops 306 or the negative polarity loops 308 could be reduced to zero width perpendicular to the measuring axis (becoming effectively simple conducting elements between the adjacent loops). In this case, the first and second receiver windings 296 and 298 become unipolar flux receivers, introducing an increased sensitivity to external fields, and reducing their output signal amplitude to half that of the previously described embodiment (due to the eliminated loop area).

However, the modified design retains many inventive benefits. The net extraneous flux through the loops is still nominally zero due to the symmetric transmitter winding configuration. The output signal from each receiver winding 296 and 298 still swings from a maximum positive value to a maximum negative value with nominally zero offset. The degree of output signal change per unit of displacement, for a given measuring range, is still very high, due to the complementary periodic structure of the scale elements and receiver windings.

Based on the nature of the quadrature output from the first and second receiver windings 296 and 298, the control unit 316 is able to determine the direction of relative motion between the read head 258 and the scale 204. The control unit 316 counts the number of partial or full "incremental" wavelengths $\lambda$ traversed, by signal processing methods well-known to those skilled in the art and disclosed herein and in the incorporated references. The control unit 316 uses that number and the relative position within a wavelength $\lambda$ to output the relative position between the read head 258 and the scale 204 from a set origin.

The control unit 316 also outputs control signals to the transmitter drive signal generator 294 to generate the time-varying transmitter drive signal. It should be appreciated that any of the signal generating and processing circuits shown in U.S. patent application Ser. No. 08/441,769, filed May 16, 1995, U.S. patent application Ser. No. 08/645,483, filed May 13, 1996 and U.S. patent application Ser. No. 08/788,469, filed Jan. 29, 1997 hereby incorporated by reference, can be used to implement the receiver signal processing circuit 314, the transmitter drive signal generator 294 and the control unit 316. Thus, these circuits will not be described in further detail herein.

Figure 8:
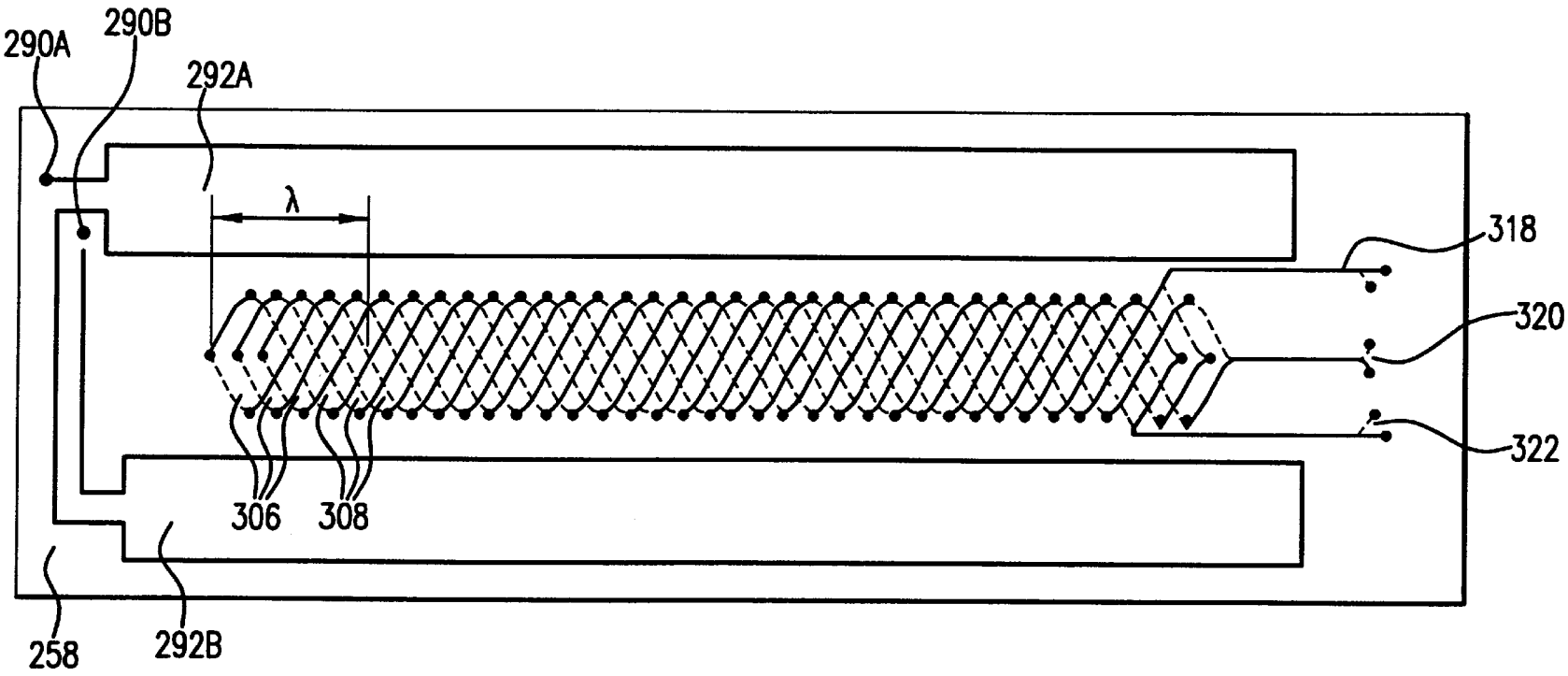
FIG. 8 shows a second embodiment of the read-head for the reduced offset induced current position transducer of this invention.
Figure 9:
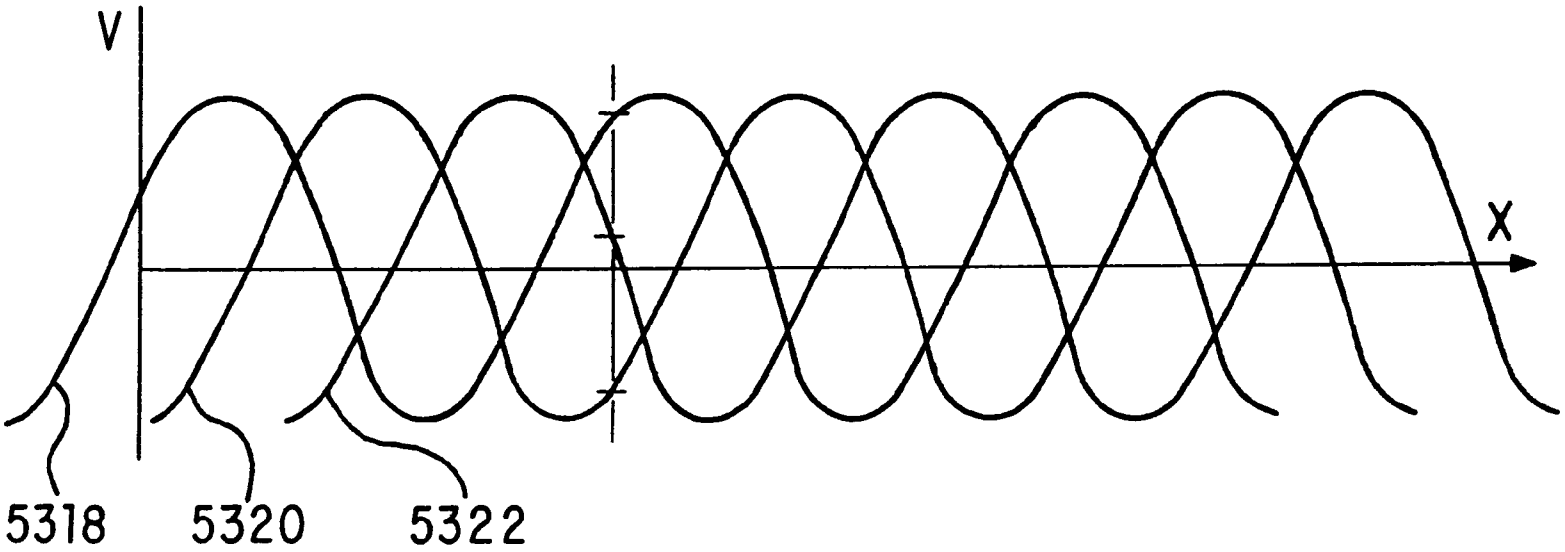
FIG. 9 shows the signal amplitudes as a function of the relative position of the scale and read-head of FIG. 8.

FIG. 8 shows a second embodiment of a read head that can be used with a scale according to FIG. 6. The receiver in this version of the read head has three receiver windings 318, 320 and 322. The receiver windings are offset from each other along the measurement axis by ⅓ of the wavelength $\lambda$. FIG. 9 shows the signal functions from the three receivers as a function of the position along the measurement axis.

It should be appreciated that perfectly sinusoidal output functions are difficult to achieve in practice, and that deviations from a perfect sinusoidal output contain spatial harmonics of the fundamental wavelength of the transducer. Therefore, the three phase configuration of this second embodiment of the reduced-offset induced current position transducer has a significant advantage over the first embodiment of the reduced offset induced current position transducer, in that the third harmonic content in the separate receiver windings' signal can be largely eliminated as a source of position measurement error.

Figure 10:
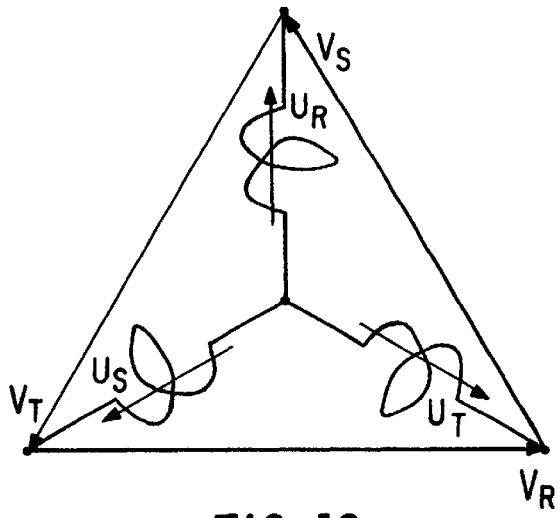
FIG. 10 shows a schematic vector phase diagram for the three phase windings of FIG. 8.

Eliminating the third harmonic is accomplished by combining the outputs of the receiver windings as shown in FIG. 10, where the three windings are connected in a star configuration and the signals used for determining position are taken between the corners of the star. This can also be accomplished by measuring each of the output signals independently from the receiver windings 318, 320 and 322, and then combining them computationally in a corresponding way in a digital signal processing circuit. The following equations outline how the third harmonic component is eliminated by suitably combining the original three phase signals, designated as $U_R$, $U_S$, and $U_T$.

Assume each of the unprocessed phase signals contains the fundamental sinusoidal signal plus the third harmonic signal, with equal amplitude in the three phases, then:

$$U_R = A_0 \sin\left(2\pi\frac{x}{\lambda}\right) + A_3 \sin\left(2\pi\frac{3x}{\lambda}\right)$$

$$U_S = A_0 \cdot \sin\left(2\pi\frac{x+\frac{\lambda}{3}}{\lambda}\right) + A_3 \sin\left(2\pi\frac{3\left(x+\frac{\lambda}{3}\right)}{\lambda}\right)$$

$$= A_0 \cdot \sin\left(2\pi\frac{x}{\lambda} + \frac{2\pi}{3}\right) + A_3 \sin\left(2\pi\frac{3x}{\lambda} + 2\pi\right)$$

$$= A_0 \cdot \sin\left(2\pi\frac{x}{\lambda} + \frac{2\pi}{3}\right) + A_3 \sin\left(2\pi\frac{3x}{\lambda}\right);$$

$$U_T = A_0 \cdot \sin\left(2\pi\frac{x-\frac{\lambda}{3}}{\lambda}\right) + A_3 \sin\left(2\pi\frac{3\left(x-\frac{\lambda}{3}\right)}{\lambda}\right)$$

$$= A_0 \cdot \sin\left(2\pi\frac{x}{\lambda} - \frac{2\pi}{3}\right) + A_3 \sin\left(2\pi\frac{3x}{\lambda} - 2\pi\right)$$

$$= A_0 \cdot \sin\left(2\pi\frac{x}{\lambda} - \frac{2\pi}{3}\right) + A_3 \sin\left(2\pi\frac{3x}{\lambda}\right)$$

Creating new signals by pair-wise subtracting the above-outlined signals from each other eliminates the third harmonic to provide:

$$V_R = U_T - U_S = A_0\left(\sin\left(2\pi\frac{x}{\lambda} - \frac{2\pi}{s}\right) - \sin\left(2\pi\frac{x}{\lambda} + \frac{2\pi}{3}\right)\right) = -A_0\sqrt{3}\cos 2\pi\frac{x}{\lambda}$$

$$V_S = U_R - U_T = A_0\left(\sin\left(2\pi\frac{x}{\lambda}\right) - \sin\left(2\pi\frac{x}{\lambda} - \frac{2\pi}{3}\right)\right) = A_0\sqrt{3}\cos\left(2\pi\frac{x}{\lambda} - \frac{2\pi}{6}\right)$$

$$V_T = U_S - U_R = A_0\left(\sin\left(2\pi\frac{x}{\lambda} + \frac{2\pi}{3}\right) - \sin\left(2\pi\frac{x}{\lambda}\right)\right) = A_0\sqrt{3}\cos\left(2\pi\frac{x}{\lambda} + \frac{2\pi}{6}\right)$$

To get quadrature signals for position calculation in the same way, $V_S$ and $V_T$ are combined:

$$V_Q = V_S - V_T = A_0\sqrt{3}\left(\cos\left(2\pi\frac{x}{\lambda} - \frac{2\pi}{6}\right) - \cos\left(2\pi\frac{x}{\lambda} + \frac{2\pi}{6}\right)\right)$$

-continued $$= A_0\sqrt{3} * 2\sin 2\pi\frac{x}{\lambda}\sin\left(-\frac{2\pi}{6}\right) = A_0 3\sin 2\pi\frac{x}{\lambda}$$

After identifying the applicable quarter-wavelength position quadrant within the incremental wavelength, the interpolated position within the quarter wavelength is then calculated by:

$$\frac{V_Q}{-V_R} = \sqrt{3} * \tan\left(2\pi\frac{x}{\lambda}\right)$$

Solving for x:

$$x = \frac{\lambda}{2\pi} * \tan^{1}\left(\frac{V_Q}{-V_R * \sqrt{3}}\right)$$

The position calculated this way using the output from three phase receiver windings will not contain any error from third harmonic components in the receiver output signal functions, to the extent that the outputs from all three receiver windings have the same third harmonic characteristics, which is generally the case for practical devices. Also, if the receiver signals are amplified in preamplifiers in the electronic unit, the measurement error caused by certain distortion errors in those electronic preamplifiers will be canceled by the above described signal processing in the three phase configuration.

FIGS. 11A–11D show a third embodiment of the read head and scale for the reduced offset induced current position transducer of the linear scale of this invention. This embodiment contains only one transmitter winding loop 490, which is placed on one side of the receiver windings 496 and 498 on the read head 458. The scale 404 is a two layer printed circuit board (PCB). Pattern forming coupling loops 474 and 476 are arrayed on the scale 404 along the measurement axis.

Each coupling loop 474 includes a first loop portion 478 which is connected by connection lines 482 to a second loop portion 480. The first and second loop portions 478 and 480 are connected so that an induced current produces the same polarity field in the first loop portion 478 and the second loop portion 480. Each coupling loop 476 includes a first loop portion 484 which is connected by connection lines 488 to a second loop portion 486. The first and second loop portions 484 and 486 are connected so that an induced current produces fields having opposite polarities in the first and second loop portions 484 and 486.

Figure 11A:
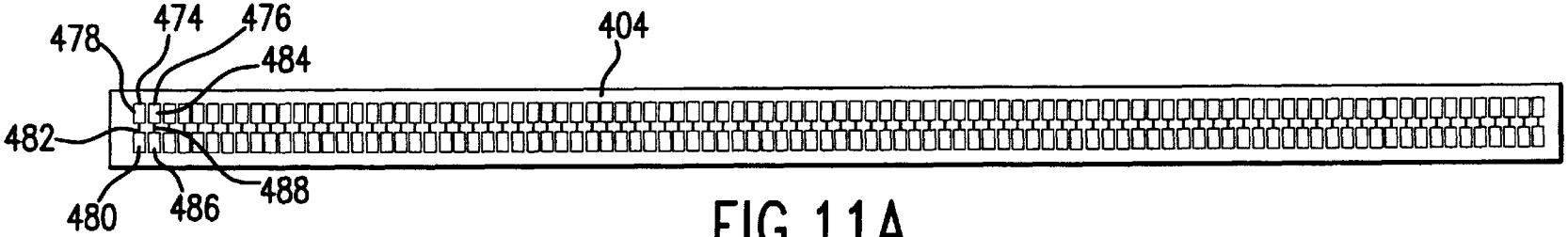
FIG. 11A shows a third embodiment of the scale for the reduced offset induced current position transducer of this invention.
Figure 11B:
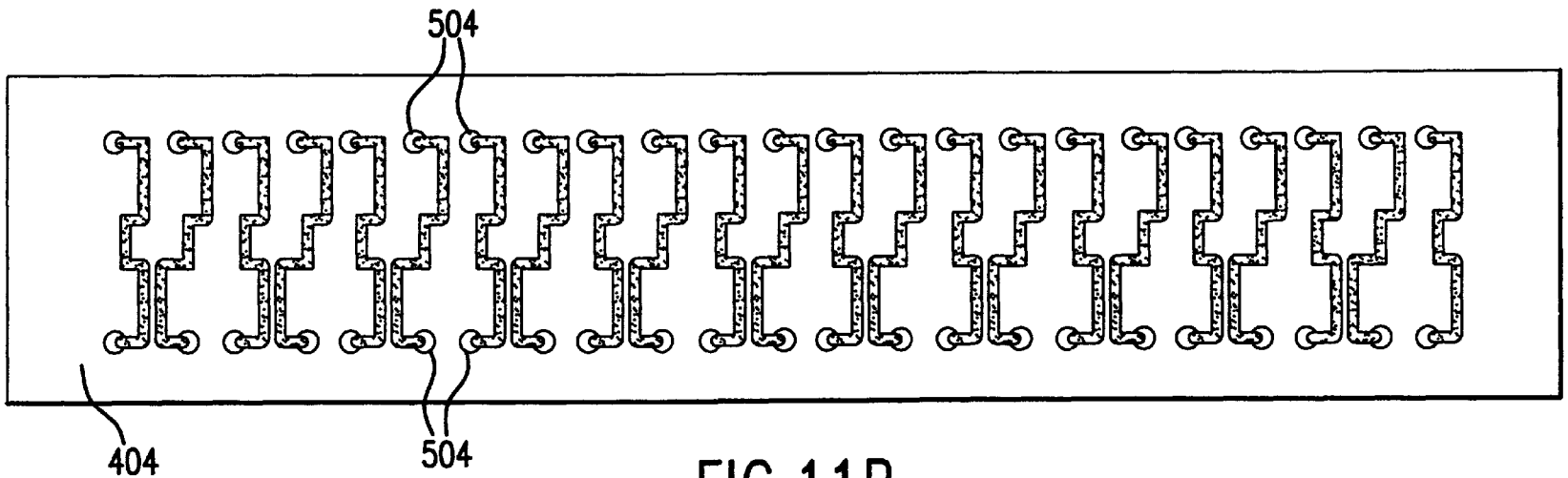
FIG. 11B shows a first portion of the scale of FIG. 11A in greater detail.
Figure 11C:
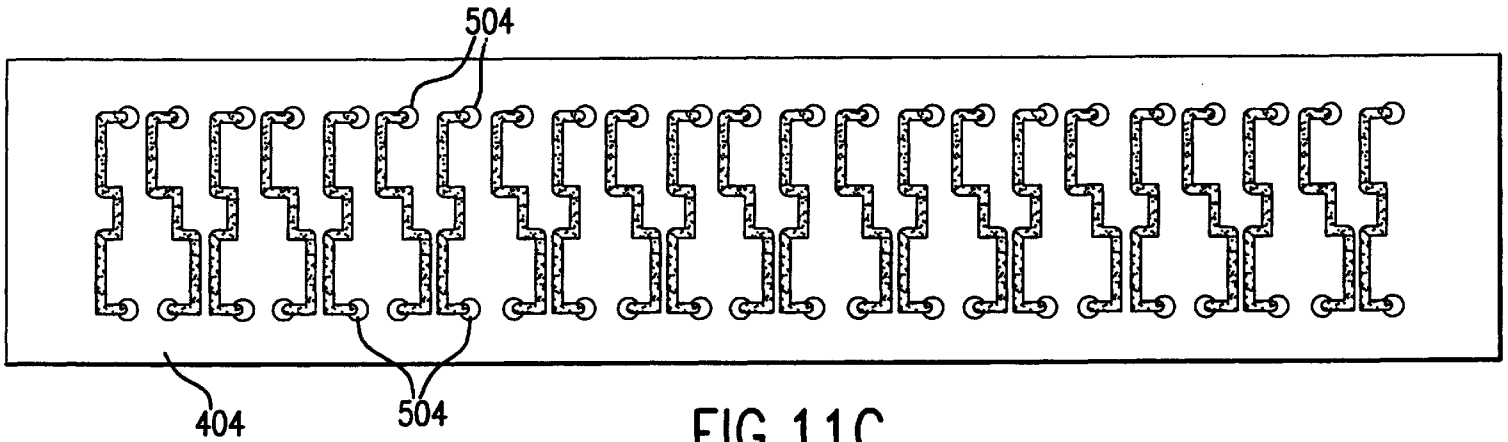
FIG. 11C shows a second portion of the scale of FIG. 11A in greater detail.

The detailed construction of the coupling loops 474 and 476 is shown in FIGS. 11B and 11C. FIG. 11B shows a first conductor pattern provided on a first one of the layers of the PCB forming the scale 404. FIG. 11C shows a second construction pattern provided on a second one of the layers of the PCB forming the scale 404. The individual portions of the first and second patterns formed on the first and second layers are connected via the feed-throughs 504 of the PCB to form the coupling loops 474 and 476.

The read head 458 is formed by a second PCB and includes a transmitter loop 490 and first and second receiver windings 496 and 498. The first and second receiver windings 496 and 498 are in this embodiment in a two-phase configuration. This embodiment could also use the three-phase configuration previously disclosed. The transmitter loop 490 encloses an area that covers the first loop portions 478 and 484 over the length of the read head. The transmitter loop 490 is excited in the same way as described previously in conjunction with FIG. 7.

Figure 11D:
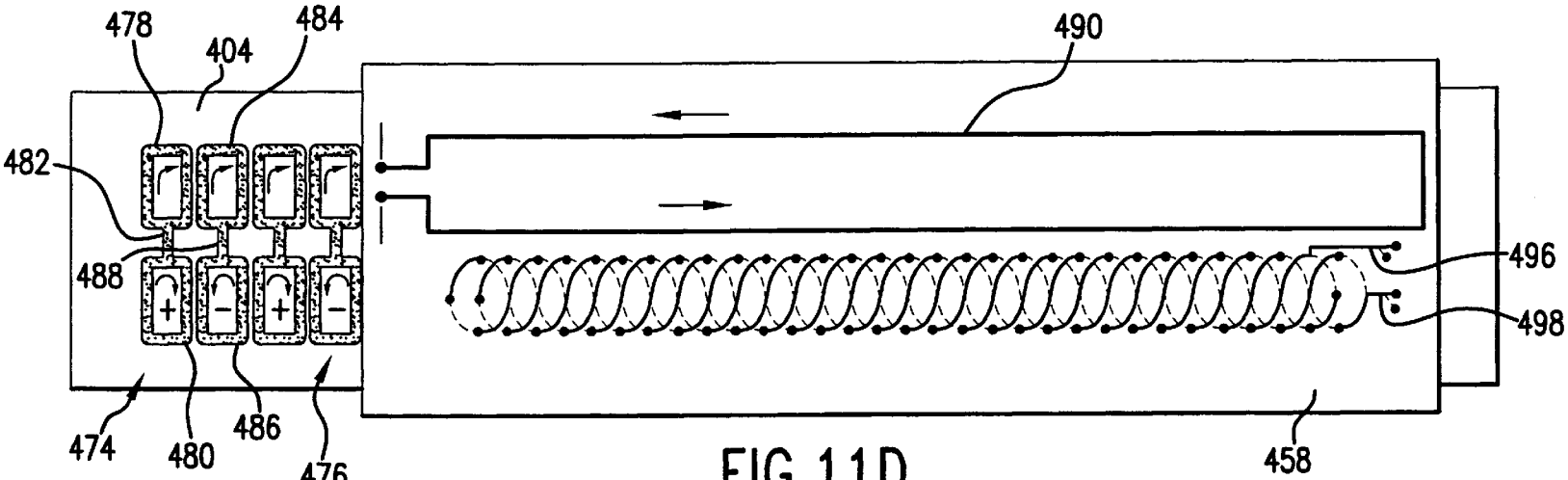
FIG. 11D shows a third embodiment of the read head usable with the scale of FIG. 11A.

The first loop portions 478 and 484 of the coupling loops 474 and 476 under the transmitter loop 490 respond to the primary magnetic field generated by the transmitter 490 with an induced EMF that causes a current and magnetic field that counteracts the primary magnetic field produced in the transmitter winding 490. When the transmitter winding current flows counter-clockwise, as shown in FIG. 11D, the induced current in the first loop portions 478 and 484 of the coupling loops 474 and 476 flows counterclockwise. The current in the second loop portions 480 of the coupling loops 474 also flows clockwise. However, the current in the second loop portions 486 of the coupling loops 476 flow counter-clockwise because of the crossed connections 488 described above.

Therefore, the array of second loop portions 480 and 486 produces a secondary magnetic field with regions of opposite polarity periodically repeating along the scale under the receiver windings 496 and 498 of the read head unit 458. The secondary magnetic field has a wavelength $\lambda$ equal to the period length for successive ones of the second loop portions 480, which is also equal to the period length for successive ones of the second loop portions 486. The receiver loops of the first and second windings 496 and 498 are designed to have the same wavelength $\lambda$ as the scale pattern.

Hence, the receiver loops of the first and second receiver windings 496 and 498 will exhibit an induced EMF which produces a signal voltage whose amplitude will follow a periodic function with wavelength $\lambda$ when the read head 458 is moved along the scale 404. Thus, except for the distinction of the single transmitter loop 490, this embodiment functions in the manner previously described for the embodiment shown in FIGS. 6 and 7. Similar to the previous discussion of second loop portions 280 and 286 of FIG. 7, the total area enclosed by the second loop portions 480 and 486 define a sensing track extending parallel to the measuring axis. In this case, the effective magnetic field within the sensing track includes some effect due to coupling to the fringe of the field produced by the transmitter winding 490. However, the current flow in the second loop portions produces a field in the sensing track that predominates over any other field.

Figure 12A:
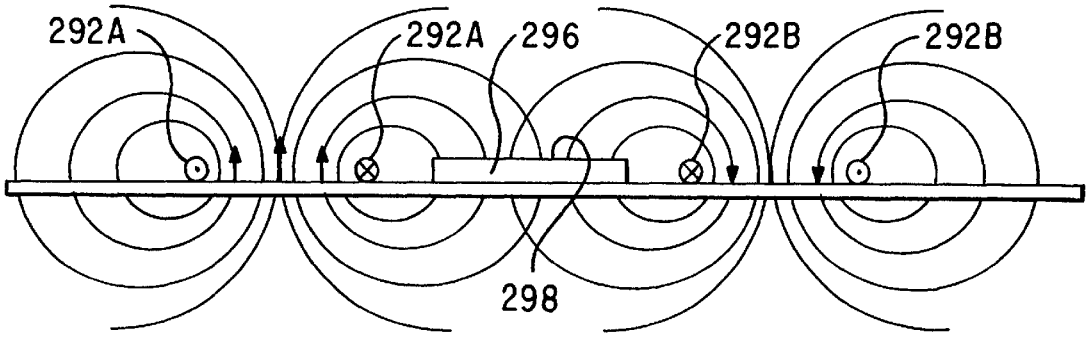
FIG. 12A shows a cross-sectional view of the first embodiment of the reduced offset induced current position transducer of this invention.

FIG. 12A shows a cross-section of an inductive read head according to the first embodiment of this invention shown in FIG. 7. FIG. 12A illustrates how the primary magnetic field caused by the current in the transmitter loop 292A encircles the conductors and partly crosses through the receiver loops 296 and 298. FIG. 12A also shows how the primary magnetic field caused by the current in the transmitter loop 292B passes through the receiver loops 296 and 298 in the opposite direction from the primary magnetic field caused by the transmitter loop 292A.

Thus, the resulting net magnetic field through the first and second receiver windings 296 and 298 will be very close to zero and the extraneous direct coupling from the transmitter loops 292A and 292B to the first and second receiver windings 296 and 298 will be nullified. Experience and theoretical calculations show an improvement in the ratio of useful to extraneous signal components by a factor of more than 100 relative to the embodiment shown in FIG. 3.

Figure 12B:
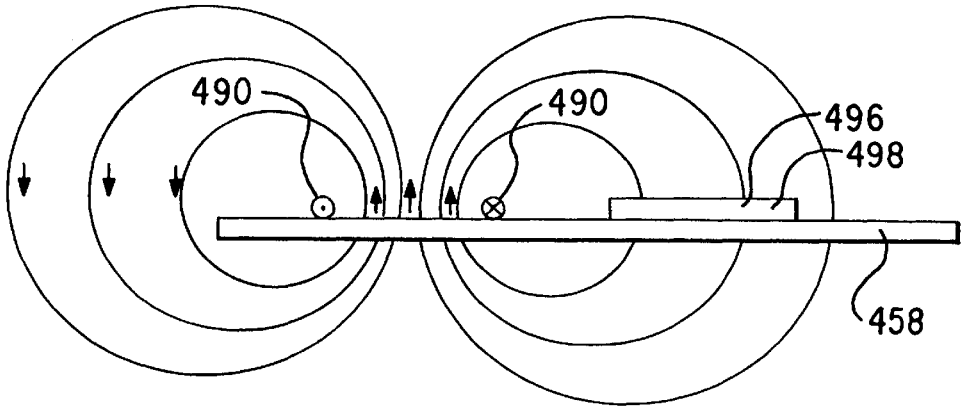
FIG. 12B shows a cross-sectional view of the second embodiment of the reduced offset induced current position transducer of this invention.

FIG. 12B shows a cross-section of an inductive read head according to the third embodiment of this invention shown in FIG. 11D. FIG. 12B illustrates how the primary magnetic field caused by the current in the transmitter loop 490 encircles the conductors and partly crosses through the first and second receiver loops 496 and 498. Although this case fails to nullify the extraneous direct coupling, as provided in the first preferred embodiment, it still reduces the extraneous direct coupling by virtue of the separation of the transmitter loop 490 and the first and second receiver windings 496 and 498.

Furthermore, the secondary magnetic field having alternating polarities is provided in the vicinity of the first and second receiver windings 496 and 498. This eliminates other sources of offset. According to experience and theoretical calculations, the third embodiment shows an improvement in the ratio of useful to extraneous signal components by a factor of about 10 relative to the embodiment shown in FIG. 3.

It should be appreciated that the previous embodiments may be modified in certain aspects, while retaining many of their inventive benefits. For example, the coupling loops 474 (or 476) of FIG. 11A may be eliminated, while other aspects of this configuration remain the same. In this case, the secondary magnetic field provided in the vicinity of the first and second receiver windings 496 and 498 does not have a pattern of alternating polarities, as in the third embodiment. However, this design still reduces the extraneous direct coupling between transmitter and receiver windings by virtue of the separation of the transmitter loop 490 and the first and second receiver windings 496 and 498.

Furthermore, the use of multiple coupling loops provides the benefit of averaging out the error contributions of small, but significant, random deviations in segments of the winding configurations due to imperfect fabrication processes. Also, even if the coupling loops 474 (or 476) are eliminated, the fundamental operation of the transducer is still based on a moving structured field, defined by the coupling loops 474 (or 476) providing the primary excitation for the first and second receiver windings 496 and 498. It should also be noted that the vertical sections of the first loop portions 478 and 484 shown in FIG. 11D could be bridged by horizontal conductors at the top and bottom (not shown). In this case, the multiple coupling loops form a single coupling loop with a single elongated portion under the transmitter winding 490, and multiple serially connected loop portions 480 and 486 under the windings 496 and 498. Thus, the moving structured field is still maintained, although the function of the first coupling loop portions 478 and 484 is now provided by a single continuous winding.

In contrast, in the embodiment shown in FIG. 3, a spatially static uniform field provided the primary excitation for the first and second receiver windings 180 and 182. The receiver winding output signals are based on how this uniform field is affected by moving elements which disturb the uniform excitation field in the vicinity of the first and second receiver windings 180 and 182. The moving structured field excitation approach of this invention provides an inherently superior signal, even if the coupling loops 474 (or 476) are eliminated.

Figure 13:
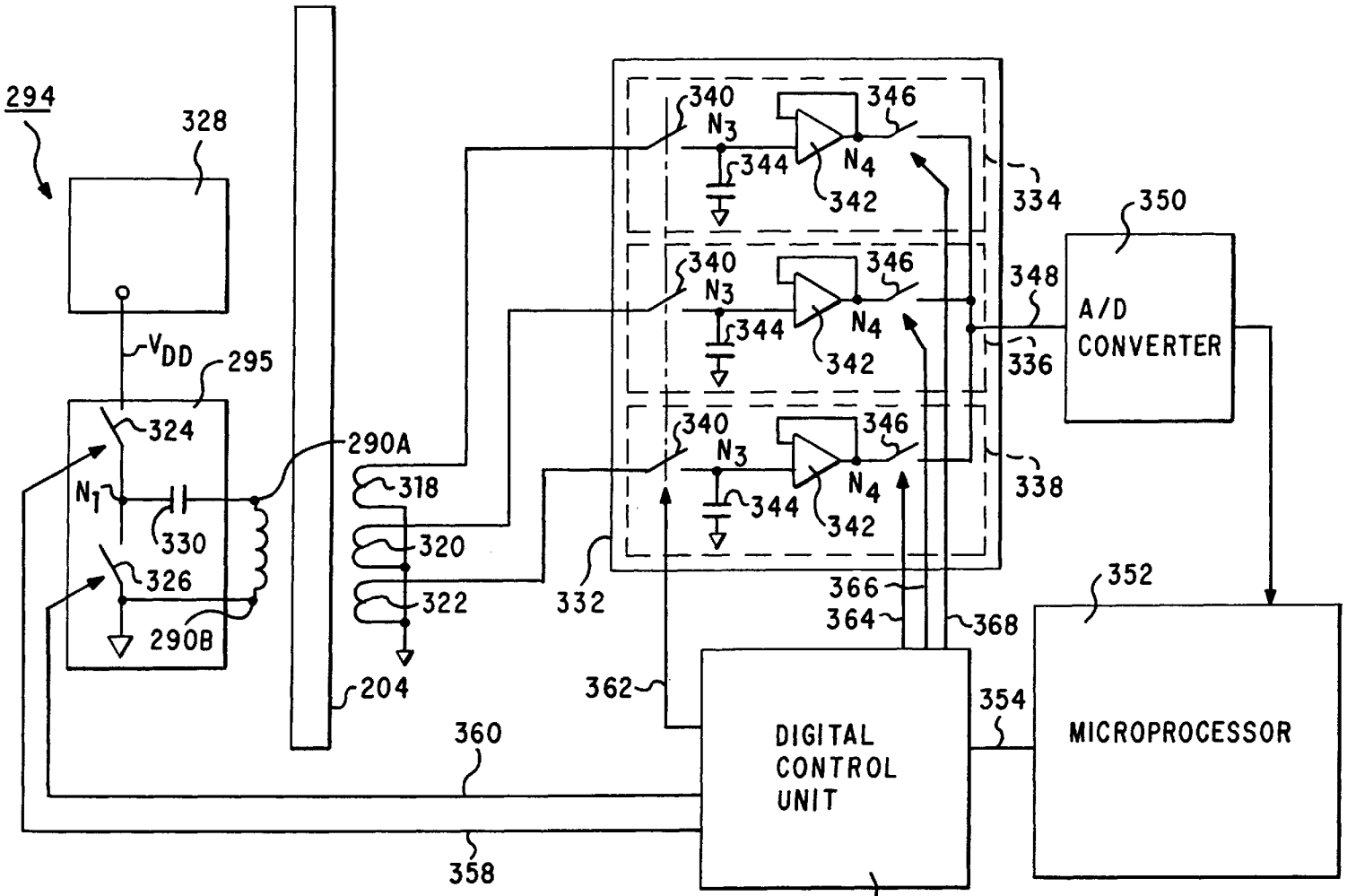
FIG. 13 is a block diagram of the read head shown in FIG. 8 and its associated signal processing circuits.

FIG. 13 shows a block diagram of the second embodiment of the reduced offset induced current position transducer 200 using the three phase read head 258 shown in FIG. 8. Only the essential portions of the signal processing circuit needed to determine the position of the read head 258 relative to the scale 204 are shown in FIG. 13.

As shown in FIG. 13, the transmitter winding 290 is connected to a signal generator circuit 295 of the transmitter drive signal generator 294. The signal generator circuit 295 includes a first switch 324 serially connected to a second switch 326 between ground and a power supply voltage $V_{DD}$ from an energy source 328. One terminal of a capacitor 330 is connected to a node $N_1$ between the first and second switches 324 and 326. A second plate of the capacitor 330 is connected to the terminal 290A of the transmitter winding 290. The second terminal 290B of the transmitter winding 290 is connected to ground. This, the transmitter winding 290 forms the inductor in a LC resonant circuit with the capacitor 330.

The transmitter winding 290 is indirectly inductively coupled via the coupling loops 274 and 276 formed on the scale 204 to the first-third receiver windings 318, 320 and 322. The receiver windings 318, 320 and 322 are connected to a sample and hold circuit 332. In particular, the output of the first receiver 318 is connected to a first sample and hold subcircuit 334. The output of the second receiver 320 is connected to a second sample and hold subcircuit 336, while the output of the third receiver 322 is connected to a third sample and hold subcircuit 338.

Each of the three sample and hold subcircuits 334, 336 and 338 includes a switch 340 receiving an output from the corresponding receiver loop 318, 320, or 322. The output of the switch 340 is connected to the positive input terminal of a buffer amplifier 342. One plate of a sample and hold capacitor 344 is connected to a node $N_3$ between the switch 340 and the buffer amplifier 342. The other plate of the sample and hold capacitor 344 is connected to ground. An output of the buffer amplifier 342 is connected to a switch 346. The negative input terminal of the buffer amplifier 342 is connected to the output of the buffer amplifier at a node $N_4$.

The outputs of the switches 346 of the three sample and hold subcircuits 334, 336 and 338 are connected to a single output line 348 that is connected to an input of analog-to-digital (A/D) converter 350. The A/D converter 350 converts the output of the sample and hold circuit 332 from an analog value to a digital value. The digital value is output to a microprocessor 352 which processes the digital values from the A/D converter to determine the relative position between the read head 258 and the scale 204.

Each position within a wavelength can be uniquely identified by the microprocessor 352, according to known techniques and the equations previously disclosed herein. The microprocessor 352 also uses known techniques to keep track of the direction of motion and the number of wavelengths that are traversed to determine the position for the transducer relative to an initial reference position.

The microprocessor 352 also controls the sequence of signal sampling by outputting a control signal over a signal line 354 to a digital control unit 356. The digital control unit 356 controls the sequence of transmission, signal sampling and A/D conversion by outputting control signals on the signal lines 358, 360, 362, 364, 366 and 368 to the transmitter drive signal generator 294 and the sample and hold circuit 332. In particular, as shown in FIG. 13, the digital control unit 356 outputs switch control signals over the signal lines 358 and 360 to the first and second switches 324 and 326, respectively, for controlling the transmitter excitation.

The digital control unit 356 outputs switch control signals on the signal lines 362, 364, 366 and 368 to the sample and hold circuit 332. In particular, the control signal 362 controllably opens and closes the switches 340 of the first-third sample and hold subcircuits 334, 336 and 338 to connect the receiver windings 318, 320 and 322 to the sample and hold capacitors 344. When the control signal 362 controllably opens the switches 340, the signals received from the receiver windings 318, 320 and 322 are stored in the sample and hold capacitors 344. The switch control signals on the signal lines 364, 366 and 368 are used to controllably connect the outputs of the buffer amplifiers 342 of one of the first-third sample and hold subcircuits 334, 336, and 338, respectively, to the A/D converter 350 over the signal line 348.

Figure 14:
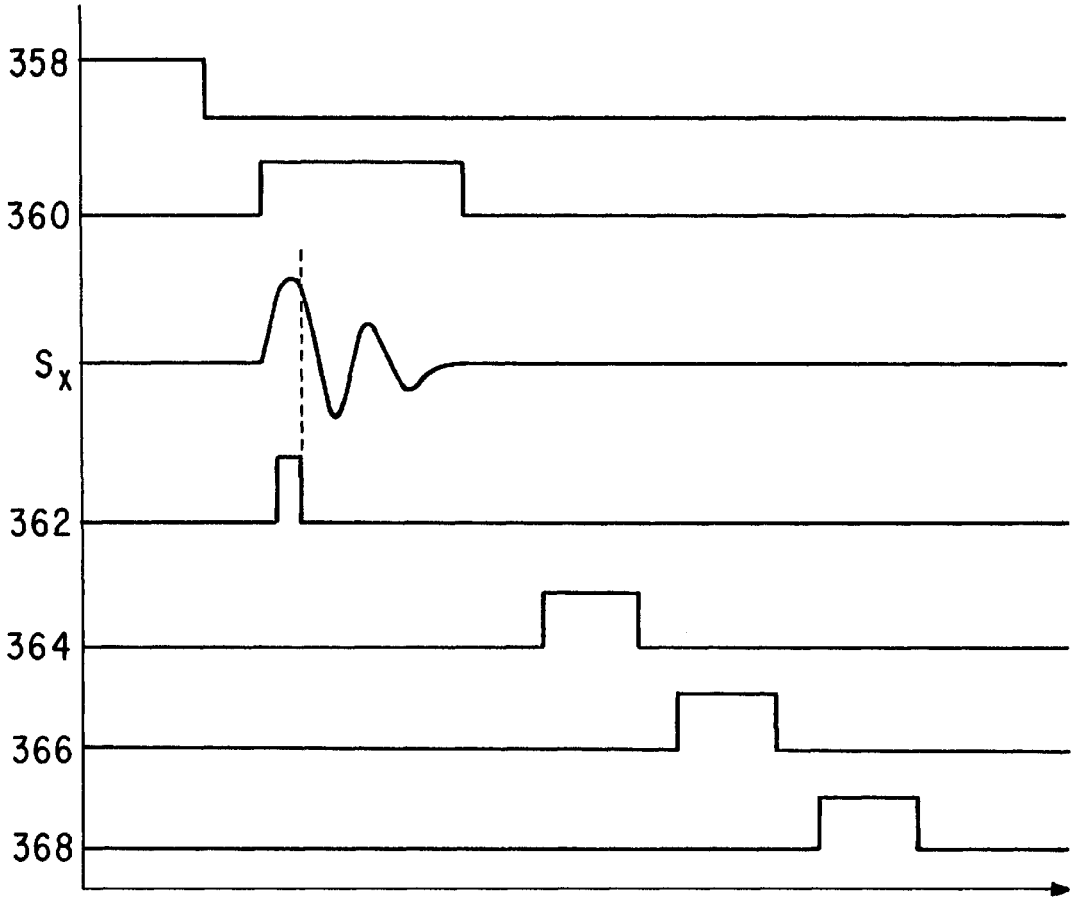
FIG. 14 is a timing diagram for one of the three channels of the electronic unit shown in FIG. 13.

FIG. 14 shows a timing diagram for generating the switch control signals 358, 360, 362, 364, 366 and 368 to obtain a position measurement. First, the switch control signal output on the signal lines 358 is set to a high state to close the switch 324. This charges up the capacitor 330 to the supply voltage $V_{DD}$. The switch control signal on the signal line 358 is then set to a low state to open the switch 324.

Next, the switch control signal output on the signal line 360 is changed from a low state to a high state to close the switch 326. This allows the capacitor 330 to discharge through the corresponding transmitter winding 290. In particular, the capacitor 330 forms a resonant circuit with the transmitter windings 290 with a chosen resonant frequency on the order of several MHz. The resonance is a damped oscillation with a waveform corresponding essentially to the signal $S_X$ shown in FIG. 14.

The signal $S_X$ appears with the same time function on each of the receiver windings 318, 320 and 322. However, the amplitude and polarity of the signal $S_X$ appearing on each of the receiver windings 318, 320 and 322 depends on the position of the read head 250 relative to the scale 204, as shown in FIG. 9.

Before the signal $S_X$ on the receiver windings reaches a peak, the switch control signal on the signal line 362 changes from a low state to a high state to begin charging each of the sample and hold capacitors 344 of the sample and hold circuit 332. At a point just after, but approximately at, the peak of the signal $S_X$, the switch control signal on the signal line 362 returns to the low state to open the switches 340. This holds the amplitude of the signals $S_X$ for each of the three receiver windings on the corresponding one of the sample and hold capacitors 344 of the first-third sample and hold subcircuits 334, 336 and 338. At some point thereafter, the switch control signal on the signal line 360 is returned to the low state to open the switch 326.

Next, at some time after the control signal 362 has returned to the low state, the switch control signal on the signal line 364 changes from the low state to the high state to close the switch 346 of the sample and hold subcircuit 334. This connects the sampled value held on the corresponding sample and hold capacitor 344 over the signal line 348 to the A/D converter 350. The A/D converter 350 converts the analog value on the signal line 348 to a digital value and outputs the digital value to the microprocessor 352. The switch control signal on the signal line 364 returns to the low state to open the corresponding switch 346. This sequence is then repeated for the switch control signals output on the signal lines 366 and 368 to connect the signals sampled by the sample and hold subcircuits 336 and 338 to the A/D converter 350 over the signal line 348.

This process is repeated according to the program in the microprocessor. A program can easily be made that adapts the sampling rate of the system to the speed of movement of the transducer, thereby minimizing the current consumption. This operation is well known to those skilled in the art and thus will not be described in further detail herein.

The previously described signal processing system can be operated on very low power with the disclosed inductive position transducers, and other related inductive position transducers, if desired. For example, intermittently activating the drive signal generator 295 to support a signal processing system sampling frequency of about 1 kHz provides sufficient accuracy and motion tracking capability for most applications. To reduce power consumption, the drive signal generator duty cycle can be kept low by making the pulses relatively short. For example, for the 1 kHz sampling frequency described above, a suitable pulse width is about 0.1–1.0 $\mu$s. That is, the duty cycle of the pulses having sampling period of 1 ms is 0.01%–0.1%.

The resonant frequency of the capacitor 330 and the winding 290 is then preferably selected such that the peak of the voltage across the capacitor 330 occurs before the end of the 1.0 $\mu$s or less pulse. Thus, the resonant frequency is on the order of several megahertz, as previously disclosed. The corresponding magnetic flux will therefore be modulated at a frequency above 1 MHz, and typically of several megahertz. This is considerably higher than the frequencies of conventional inductive position transducers.

The inventors have determined that, at these frequencies, the currents generated in the scale 204 with the coupling loops 274 and 276 produce strong inductive coupling to the first-third receiver windings 318, 320 and 322. The EMFs generated in the first-third receiver windings 318, 320 and 322, and the resulting output signal, therefore respond strongly to variations in coupling loop position. This occurs despite the low duty cycle and low power used by the pulsed drive signal.

The strength of the response, combined with the low duty cycle and low power consumption, allows the inductive position transducer to make measurements while the drive signal generator 294 and the remainder of the signal processing electronic circuit shown in FIG. 13 draw an average current preferably below 200 $\mu$A, and more preferably below 75 $\mu$A, for lower power applications. It should be understood that "average current" as used herein means the total charge consumed over one or more measurement cycles, divided by the duration of the one or more measurement cycles, while the inductive position transducer is in normal use.

The inductive position transducers similar to the type disclosed herein can therefore be operated with an adequate battery lifetime using three or fewer commercially available miniature batteries or with a photo-electric cell. Further details regarding low power signal processing are disclosed in the incorporated references.

It should be appreciated that although the foregoing embodiments are shown with spatially uniform windings designated as the transmitter windings, and spatially modulated windings designated as the receiver windings, it will be apparent to one skilled in the art that the disclosed transducer winding configurations will retain all of their inventive benefits if the roles of the transmitter and receiver windings are "reversed" in conjunction with appropriate signal processing. One such appropriate signal processing technique is disclosed in reference to FIG. 21 of incorporated U.S. patent application Ser. No. 08/441,769. Other applicable signal processing techniques will be apparent to those skilled in the art.

Thus, while this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An electronic caliper comprising:

a slide;

an elongated beam having a measuring axis, the slide movable along the measuring axis;

at least one magnetic field generator, each magnetic field generator responsive to a drive signal to generate a first changing magnetic flux in a first flux region;

at least one flux coupling loop, a first portion of the at least one flux coupling loop positionable within the first flux region and responsive to the first changing magnetic flux when positioned within the first flux region to produce a second changing magnetic flux in a second portion of the flux coupling loop in a second flux region that is separated from the first flux region; and at least one magnetic flux sensor;

wherein:

one of a) the at least one magnetic flux sensor or b) the at least one magnetic field generator includes an inductive area extending along the measuring axis, and the inductive area is spatially modulated along the measuring axis in a pattern including alternating increases and decreases in width, each magnetic flux sensor is positioned outside the first flux region to sense the second changing magnetic flux in the second flux region portion of at least one flux coupling loop, and each magnetic flux sensor is responsive to the second changing magnetic flux to generate an output signal which is a function of the relative position between the slide and the elongated beam.

2. The electronic caliper of claim 1, wherein the inductive area comprises a plurality of alternating polarity regions.

3. The electronic caliper of claim 2, wherein the pattern of alternating polarity regions comprises regions along a surface, the regions bounded by at least one conductor positioned on the surface in a prescribed pattern.

4. The electronic caliper of claim 1, wherein the one of a) the at least one magnetic field generator or b) the at least one magnetic flux sensor which has the inductive area spatially modulated along the measuring axis is positioned on one of the slide and the elongated beam, and the at least one flux coupling loop is positioned on the other one of the slide and the elongated beam.

5. The electronic caliper of claim 4, wherein the other of a) the at least one magnetic field generator and b) the at least one magnetic flux sensor is positioned on either the slide or the elongated beam.

6. The electronic caliper of claim 1, wherein in the absence of the at least one flux coupling loop, the output signal generated by each magnetic flux sensor is insensitive to the changing magnetic flux generated by each magnetic field generator.

7. The electronic caliper of claim 1, wherein the at least one magnetic field generator, the at least one flux coupling loops and the at least one magnetic flux sensor are fabricated by printed circuit board processing.

8. The electronic caliper of claim 1, further comprising:

an energy supply source that outputs a power supply;

a drive circuit that inputs the power supply and outputting a drive signal to the at least one magnetic field generator during each measurement cycle; and an analyzing circuit that inputs the output signal from each at least one magnetic field sensor, determines the position of the slide relative to the elongated beam, and outputs a position signal indicative of the position of the slide relative to the elongated beam at a first level of resolution.

9. The electronic caliper of claim 8, wherein the drive circuit comprises a capacitor discharged through the at least one magnetic field generator.

10. The electronic caliper of claim 9, wherein the capacitor and the at least one magnetic field generator form a resonant circuit.

11. The electronic caliper of claim 8, wherein the analyzing circuit comprises a counter for counting fractions of cycles of the at least one output signal output from the at least one magnetic field sensor at a second level of resolution coarser than the first level of resolution in response to motion of the slide along the measuring axis.

12. The electronic caliper of claim 8, wherein each of a plurality of 3*N, where N is greater than or equal to 1, of magnetic flux sensors comprise identical inductive areas spatially modulated along the measuring axis with a periodic modulation having a wavelength W, and such inductive areas are offset from each other by a length O=W/3N along the measuring axis; and the analyzing circuit substantially eliminates the influence of signal components which are third harmonics of the wavelength W.

13. The electronic caliper of claim 1, wherein the changing magnetic flux generated by the at least one magnetic field generator changes at a rate equivalent to an oscillation frequency of at least 1 MHz.

14. The electronic caliper of claim 1, wherein the pattern including alternating increases and decreases in width comprises a periodic pattern having a selected wavelength.

15. The electronic caliper of claim 14, wherein the portion of each coupling loop adjacent the periodic pattern spans, at most, one-half wavelength along the measuring axis.

16. The electronic caliper of claim 14, wherein a first plurality of coupling loops of a first type are arranged along the measuring axis at a pitch equal to the wavelength.

17. The electronic caliper of claim 16, wherein a second plurality of coupling loops of a second type are arranged along the measuring axis offset by one-half wavelength from the first plurality of coupling loops and at a pitch equal to the wavelength, and the coupling loops of the first and second type alternate along the measuring axis in at least the region adjacent to the periodic pattern.

18. The electronic caliper of claim 17, wherein, in one of the first or second coupling loop types, the induced current produces the same polarity flux in the first flux region portion and the second flux region portion, and, in the other of the first or second coupling loop types, the induced current produces flux in the second flux region portion which is opposite in polarity to the flux induced in the first flux region portion.

19. The electronic caliper of claim 17, wherein the first and second coupling loop types couple to the same magnetic flux generator region and are configured so that coupling loops of the first type extend in a first direction perpendicular to the measuring axis to couple to a first magnetic flux sensor region and the coupling loops of the second type extend in an opposite direction perpendicular to the measuring axis to couple to a second magnetic flux sensor region.

20. The electronic caliper of claim 17, wherein the first and second coupling loop types couple to the same magnetic flux sensor region, but are configured so that coupling loops of the first type extend in a first direction perpendicular to the measuring axis to couple to a first magnetic flux generator region and the coupling loops of the second type extend in an opposite direction perpendicular to the measuring axis to couple to a second magnetic flux generator region.

21. The electronic caliper of claim 1, wherein a) the at least one magnetic flux generator or b) the at least one magnetic flux sensor comprises two similar portions arranged symmetrically on opposite sides of the other of the at least one magnetic flux generator and the at least one magnetic flux sensor, such that in absence of coupling loops, the net flux through the magnetic flux sensor is substantially zero as a result of the symmetric configuration.

22. The electronic caliper of claim 1, wherein the at least one flux coupling loop comprises a plurality of flux coupling loops arranged along the measuring axis and the measuring range of the sensor is determined by the extent of the plurality of coupling loops.

23. The electronic caliper of claim 1, wherein each of a plurality of the inductive areas which are spatially modulated along the measuring axis comprises an area outlined by a patterned conductor insulated from other patterned conductors, and a plurality of such inductive areas at least partially overlap.

24. The electronic caliper of claim 23, wherein each of a plurality of N inductive areas which are spatially modulated along the measuring axis is identical and is periodically modulated along the measuring axis with a selected wavelength W, and such inductive areas are offset from each other by a length O along the measuring axis, where O=W/2N for N equal to 2, and O=W/N for N greater than 2.

25. An electronic caliper comprising:

a slide;

an elongated beam having a measuring axis, the slide movable along the measuring axis;

a low power energy supply source on the slide capable of providing a power supply to a drive circuit on the slide;

the drive circuit connected to the power supply and responsive to a control signal to output an intermittent drive signal;

at least one magnetic field generator on the slide, each magnetic field generator responsive to the drive signal to generate a first changing magnetic flux in a first flux region;

at least one flux coupling loop on the elongated beam, a first portion of the at least one flux coupling loop positionable within the first flux region and responsive to the first changing magnetic flux when positioned within the first flux region to produce a second changing magnetic flux in a second flux region proximate to a second portion of the flux coupling loop outside the first flux region;

at least one magnetic flux sensor on the slide, each magnetic flux sensor positioned outside the first flux region for sensing the second changing magnetic flux in the second flux region portion of the at least one flux coupling loop, and each magnetic flux sensor responsive to the second changing magnetic flux to generate an output signal which is a function of the relative position between the magnetic flux sensor and the at least one flux coupling loop; and an analyzing circuit on the slide responsive to the output signal from at least one magnetic flux sensor to output an output signal indicative of the position of the slide relative to the elongated beam at a first level of resolution.

26. The electronic caliper of claim 25, wherein the drive circuit comprises a capacitor that discharges through the magnetic field generator.

27. The electronic caliper of claim 26, wherein the capacitor and the magnetic field generator operate as a resonant circuit.

28. The electronic caliper of claim 26, wherein the first changing magnetic flux changes at a rate equivalent to an oscillation frequency of at least 1 MHz in response to the intermittent drive signal.

29. The electronic caliper of claim 26, wherein the intermittent drive signal comprises at least one pulse signal.

30. The electronic caliper of claim 29, wherein the analyzing circuit determines changes in the relative position at a coarse level of resolution during each pulse interval, and determines the relative position at a finer level of resolution once during a plurality of pulse intervals.

31. The electronic caliper of claim 29, wherein the analyzing circuit includes synchronous sampling means for sampling the output signal from at least one magnetic flux sensor synchronously with the pulse signal.

32. The electronic caliper of claim 31, wherein the synchronous sampling uses sample timing based on an expected time delay between the pulsed signal and a peak in a response to a resonant circuit formed by the pulse generator components and the magnetic field generator components.

33. The electronic caliper of claim 26, wherein:

at least one of a) the at least one magnetic flux sensor, and b) the at least one magnetic field generator includes an inductive area extending along the measuring axis, and the inductive area is spatially modulated along the measuring axis in a pattern including alternating increases and decreases in width;

the output signal from each magnetic flux sensor exhibits spatial cycles which are a function of a relative position between the magnetic flux sensor and the at least one flux coupling loop; and the analyzing circuit comprises a counter for counting fractions of cycles of the output signal from the at least one magnetic flux sensor in response to motion of the slide along the elongated beam, at a second level of resolution coarser than the first level of resolution, the counter providing an approximate position of the slider assembly relative to the elongate beam.

34. The electronic caliper of claim 33, wherein the counter is responsive at spatial intervals of at most ¼ cycle.

35. The electronic caliper of claim 33, wherein the inductive area comprises a plurality of alternating polarity regions.

36. The electronic caliper of claim 35, wherein the plurality of alternating polarity regions comprises regions of a surface bounded by at least one conductor positioned on the surface in a prescribed pattern.

37. A method for operating an electronic caliper, comprising:

supplying power from a self-contained energy supply source to a drive circuit of the electronic caliper;

outputting a drive signal from the drive circuit in response to a control signal;

inducing a current in at least one flux coupling loop in response to the drive signal, wherein the at least one flux coupling loop is positioned on one of a slide and an elongated beam of the electronic caliper, the elongated beam having a measuring axis, the slide being moveable along the measuring axis, and the at least one flux coupling loop being arranged along the measuring axis;

producing a spatially modulated time-varying magnetic field with the at least one flux coupling loop in response to the current, the spatially modulated time-varying magnetic field extending along the measuring axis;

sensing the spatially modulated time-varying magnetic field using at least one magnetic flux sensor on the other of the slide and the elongated beam;

generating a position signal based on the sensed field; and analyzing the position signal to generate an output indicative of a relative position of the slide and the elongated beam.

38. The method of claim 37, wherein:

the spatially modulated time-varying magnetic field is generated and sensed in a sensing track positioned parallel to the measuring axis; and the spatially modulated time-varying magnetic field predominates the total magnetic field within the sensing track.

*39. An electronic caliper comprising:*

*a slide;*

*an elongated beam having a measuring axis, the slide movable along the measuring axis:*

*at least one magnetic field generator, each magnetic field generator responsive to a drive signal to generate a primary changing magnetic flux in a corresponding primary flux region;*

*at least one operably positionable flux coupling loop associated with at least one of the at least one magnetic field generator, wherein, for each operably positionable flux coupling loop, a portion of that flux coupling loop is positionable within the corresponding primary flux region of the associated at least one magnetic field generator and, for each operably positionable flux coupling loop, that portion of that flux coupling loop is responsive to the primary changing magnetic flux when that portion of that flux coupling loop is positioned within the corresponding primary flux region to produce a secondary changing magnetic flux in a portion of that flux coupling loop that is separated from the corresponding primary flux region; and*

*at least one magnetic flux sensor:*

*wherein:*

*one of a) the at least one magnetic flux sensor or b) the at least one magnetic field generator includes at least one inductive area extending along the measuring axis, and the inductive area is spatially modulated along the measuring axis in a pattern including alternating increases and decreases in width, and*

*for each magnetic flux sensor:*

*that magnetic flux sensor is positioned outside the corresponding primary flux region of at least one magnetic field generator to sense, in at least one associated operably positionable flux coupling loop, the secondary changing magnetic flux in the portion of that flux coupling loop that is separated from the corresponding primary flux region, and*

*that magnetic flux sensor is responsive to the sensed secondary changing magnetic flux to generate an output signal which is a function of the relative position between the slide and the elongated beam.*

*40. The electronic caliper of claim 39, wherein each inductive area comprises a plurality of alternating polarity regions.*

*41. The electronic caliper of claim 40, wherein each pattern of alternating polarity regions comprises regions along a surface, the regions bounded by at least one conductor positioned on the surface in a prescribed pattern.*

*42. The electronic caliper of claim 39, wherein the one of a) the at least one magnetic field generator or b) the at least one magnetic flux sensor which has the at least one inductive area spatially modulated along the measuring axis is positioned on one of the slide and the elongated beam, and the*

*at least one operably positionable flux coupling loop is positioned on the other one of the slide and the elongated beam.*

*43. The electronic caliper of claim 42, wherein the other of a) the at least one magnetic field generator and b) the at least one magnetic flux sensor is positioned on either the slide or the elongated beam.*

*44. The electronic caliper of claim 39, wherein in the absence of the at least one associated operably positionable flux coupling loop, the output signal generated by that associated magnetic flux sensor is relatively insensitive to the changing magnetic flux in the corresponding primary flux region.*

*45. The electronic caliper of claim 39, wherein the at least one magnetic field generator, the at least one operably positionable flux coupling loop and the at least one magnetic flux sensor are fabricated by printed circuit board processing.*

*46. The electronic caliper of claim 39, further comprising:*

*an energy supply source that outputs a power supply;*

*a drive circuit that inputs the power supply and that outputs a drive signal to at least one of the at least one magnetic field generator during each measurement cycle; and*

*an analyzing circuit that inputs the output signal from at least one of the at least one magnetic field sensor, determines the position of the slide relative to the elongated beam, and outputs a position signal indicative of the position of the slide relative to the elongated beam at a first level of resolution.*

*47. The electronic caliper of claim 46, wherein the drive circuit comprises a capacitor discharged through the at least one magnetic field generator.*

*48. The electronic caliper of claim 47, wherein the capacitor and each of the at least one magnetic field generator form a resonant circuit.*

*49. The electronic caliper of claim 46, wherein the analyzing circuit comprises a counter for counting fractions of cycles of the at least one output signal output from the at least one magnetic field sensor at a second level of resolution coarser than the first level of resolution in response to motion of the slide along the measuring axis.*

*50. The electronic caliper of claim 46, wherein each of a plurality of N magnetic flux sensors, where N is greater than or equal to 3, comprise identical inductive areas spatially modulated along the measuring axis with a periodic modulation having a wavelength W, and such inductive areas are offset from each other by a length O=W/N along the measuring axis; and*

*the analyzing circuit substantially eliminates the influence of signal components which are third harmonics of the wavelength W.*

*51. The electronic caliper of claim 39, wherein the changing magnetic flux generated by the at least one magnetic field generator changes at a rate equivalent to an oscillation frequency of at least 1 MHz.*

*52. The electronic caliper of claim 39, wherein the pattern including alternating increases and decreases in width comprises a periodic pattern having a selected wavelength.*

*53. The electronic caliper of claim 52, wherein the portion of each operably positionable flux coupling loop adjacent the periodic pattern spans, at most, one-half wavelength along the measuring axis.*

*54. The electronic caliper of claim 52, wherein a first plurality of operably positionable flux coupling loops of a first type are arranged along the measuring axis at a pitch equal to the wavelength.*

*55. The electronic caliper of claim 54, wherein a second plurality of operably positionable flux coupling loops of a second type are arranged along the measuring axis offset by one-half wavelength from the first plurality of operably positionable flux coupling loops and at a pitch equal to the wavelength, and the operably positionable flux coupling loops of the first and second type alternate along the measuring axis in at least the region adjacent to the periodic pattern.*

*56. The electronic caliper of claim 55, wherein, in one of the first or second flux coupling loop types, the induced current produces the same polarity flux in the portion of an operably positionable flux coupling loop positionable within the corresponding primary flux region and in the portion of that flux coupling loop that is separated from the corresponding primary flux region, and, in the other of the first or second flux coupling loop types, the induced current produces flux in the portion of an operably positionable flux coupling loop that is separated from the corresponding primary flux region which is opposite in polarity to the flux induced in the portion of that flux coupling loop positionable within the corresponding primary flux region.*

*57. The electronic caliper of claim 55, wherein the first and second flux coupling loop types couple to the same magnetic field generator region and are configured so that the operable positionable flux coupling loops of the first type extend in a first direction perpendicular to the measuring axis to couple to a first magnetic flux sensor region and the operably positionable flux coupling loops of the second type extend in an opposite direction perpendicular to the measuring axis to couple to a second magnetic flux sensor region.*

*58. The electronic caliper of claim 55, wherein the first and second flux coupling loop types couple to the same magnetic flux sensor region, but are configured so that the operably positionable flux coupling loops of the first type extend in a first direction perpendicular to the measuring axis to couple to a first magnetic flux generator region and the operably positionable flux coupling loops of the second type extend in an opposite direction perpendicular to the measuring axis to couple to a second magnetic flux generator region.*

*59. The electronic caliper of claim 39, wherein a) the at least one magnetic flux generator or b) the at least one magnetic flux sensor comprises two similar portions arranged symmetrically on opposite sides of the other of the at least one magnetic flux generator and the at least one magnetic flux sensor, such that in absence of the at least one operably positionable flux coupling loop, the net flux through the magnetic flux sensor is substantially zero as a result of the symmetric configuration.*

*60. The electronic caliper of claim 39, wherein the at least one operably positionable flux coupling loop comprises a plurality of flux coupling loops arranged along the measuring axis and the measuring range of the sensor is determined by the extent of the plurality of flux coupling loops.*

*61. The electronic caliper of claim 39, wherein each of a plurality of the inductive areas which are spatially modulated along the measuring axis comprises an area outlined by a patterned conductor insulated from other patterned conductors, and a plurality of such inductive areas at least partially overlap.*

*62. The electronic caliper of claim 61, wherein each of a plurality of N inductive areas which are spatially modulated along the measuring axis is identical and is periodically modulated along the measuring axis with a selected wavelength W, and such inductive areas are offset from each other*

*by a length O along the measuring axis, where O=W/2N for N equal to 2, and O=W/N for N greater than 2.*

*63. An electronic caliper comprising:*

*a slide;*

*an elongated beam having a measuring axis, the slide movable along the measuring axis;*

*a low power energy supply source on the slide capable of providing a power supply to a drive circuit on the slide;*

*the drive circuit connected to the power supply and responsive to a control signal to output an intermittent drive signal;*

*at least one magnetic field generator on the slide, each magnetic field generator responsive to the drive signal to generate a primary changing magnetic flux in a corresponding primary flux region;*

*at least one operable positionable flux coupling loop on the elongated beam associated with at least one of the at least one magnetic field generator, wherein, for each operably positionable flux coupling loop, a portion of that flux coupling loop is positionable within the corresponding primary flux region of the associated at least one magnetic field generator and, that portion of that flux coupling loop is responsive to the primary changing magnetic flux when that portion of that flux coupling loop is positioned within the corresponding primary flux region to produce a secondary changing magnetic flux in a portion of that flux coupling loop that is outside the corresponding primary flux region; and*

*at least one magnetic flux sensor on the slide, wherein, for each magnetic flux sensor:*

*that magnetic flux sensor is positioned outside the corresponding primary flux region of at least one magnetic field generator for sensing, in at least one associated flux coupling loop, the secondary changing magnetic flux in the portion that is outside the corresponding primary flux region of each at least one associated flux coupling loop, and*

*that magnetic flux sensor is responsive to the sensed secondary changing magnetic flux to generate an output signal which is a function of the relative position between the magnetic flux sensor and the at least one associated flux coupling loop; and*

*an analyzing circuit on the slide responsive to the output signal from at least one magnetic flux sensor to output an output signal indicative of the position of the slide relative to the elongated beam at a first level of resolution.*

*64. The electronic caliper of claim 63, wherein the drive circuit comprises a capacitor that discharges through the magnetic field generator.*

*65. The electronic caliper of claim 64, wherein the capacitor and each of the at least one magnetic field generator operate as a resonant circuit.*

*66. The electronic caliper of claim 64, wherein the primary changing magnetic flux changes at a rate equivalent to an oscillation frequency of at least 1 MHz in response to the intermittent drive signal.*

*67. The electronic caliper of claim 64, wherein the intermittent drive signal comprises at least one pulse signal.*

*68. The electronic caliper of claim 67, wherein the analyzing circuit determines changes in the relative position at a coarse level of resolution during each pulse interval, and determines the relative position at a finer level of resolution once during a plurality of pulse intervals.*

*69. The electronic caliper of claim 67, wherein the analyzing circuit includes synchronous sampling means for sampling the output signal from at least one magnetic flux sensor synchronously with the pulse signal.*

*70. The electronic caliper of claim 69, wherein the synchronous sampling uses sample timing based on an expected time delay between the pulsed signal and a peak in a response to a resonant circuit formed by the pulse generator components and the magnetic field generator components.*

*71. The electronic caliper of claim 63, wherein*

*at least one of a) each of the at least one magnetic flux sensor, and b) each of the at least one magnetic field generator includes at least one inductive area extending along the measuring axis, and the at least one inductive area is spatially modulated along the measuring axis in a pattern including alternating increases and decreases in width;*

*the output signal from each of the at least one magnetic flux sensor exhibits spatial cycles which are a function of a relative position between that magnetic flux sensor and the at least one associated flux coupling loop; and*

*the analyzing circuit comprises a counter for counting fractions of cycles of the output signal from the at least one magnetic flux sensor in response to motion of the slide along the elongated beam, at a second level of resolution coarser than the first level of resolution, the counter providing an approximate position of the slider assembly relative to the elongate beam.*

*72. The electronic caliper of claim 71, wherein the counter is responsive at spatial intervals of at most ¼ cycle.*

*73. The electronic caliper of claim 71, wherein the inductive area comprises a plurality of alternating polarity regions.*

*74. The electronic caliper of claim 73, wherein the plurality of alternating polarity regions comprises regions of a surface bounded by at least one conductor positioned on the surface in a prescribed pattern.*

* * * * *